United States Patent
Semiao et al.

(10) Patent No.: US 11,750,279 B2
(45) Date of Patent: Sep. 5, 2023

(54) SOFTWARE-BASED ORCHESTRATION OF COMMUNICATION PAYLOADS IN SATELLITES

(71) Applicant: KRATOS INTEGRAL HOLDINGS, LLC, San Diego, CA (US)

(72) Inventors: Anthony Semiao, Purcellville, VA (US); Robert Potter, Mountain View, CA (US); Gregory L. Quiggle, Leesburg, VA (US); Stuart Daughtridge, Huntingtown, MD (US)

(73) Assignee: KRATOS INTEGRAL HOLDINGS, LLC, San Diego, CA (US)

( * ) Notice: Subject to any disclaimer, the term of this patent is extended or adjusted under 35 U.S.C. 154(b) by 180 days.

(21) Appl. No.: 17/347,068

(22) Filed: Jun. 14, 2021

(65) Prior Publication Data
US 2021/0399798 A1  Dec. 23, 2021

Related U.S. Application Data

(60) Provisional application No. 63/039,218, filed on Jun. 15, 2020.

(51) Int. Cl.
| | | |
|---|---|---|
| *H04B 7/185* | (2006.01) | |
| *H04B 7/06* | (2006.01) | |
| *H04L 5/00* | (2006.01) | |

(52) U.S. Cl.
CPC ....... *H04B 7/18584* (2013.01); *H04B 7/0695* (2013.01); *H04B 7/1858* (2013.01); *H04B 7/18523* (2013.01); *H04L 5/0044* (2013.01)

(58) Field of Classification Search
CPC ........ H04B 7/185–195; H04B 7/18584; H04B 7/18523; H04B 7/1858; H04B 7/0695; H04L 5/0044
See application file for complete search history.

(56) References Cited

U.S. PATENT DOCUMENTS

| 9,621,255 B1 * | 4/2017 | Chu .................. H04B 7/18515 |
| 2012/0110028 A1 * | 5/2012 | Athreya ................ G06F 16/214 |
| | | 707/E17.005 |

(Continued)

FOREIGN PATENT DOCUMENTS

| EP | 3379520 A1 | 9/2018 |
| EP | 3863193 A1 | 8/2021 |

OTHER PUBLICATIONS

Zhang Chi et al: The Design and Implementation of Scenario Demonstration Software System for Intelligent Satellite Artificial System, 2018 5th International Conference on Information Science and Control Engineering (ICISCE), IEEE, Jul. 20, 2018 (Jul. 20, 2018), pp. 1267-1271, XP033501884, DOI: 10.1109/ICISCE.2018.00258.

(Continued)

*Primary Examiner* — Raymond S Dean
(74) *Attorney, Agent, or Firm* — Procopio, Cory, Hargreaves & Savitch LLP

(57) ABSTRACT

Software-based orchestration of communication payloads in satellites. In an embodiment, a payload model of a satellite payload, defined in a data modeling language (e.g., YANG) and representing a configuration for the satellite payload, is received. The configuration specifies a setting for at least one component of the satellite payload. The payload model is translated into one or more satellite commands for configuring the satellite payload according to the configuration represented in the payload model, and the satellite payload is reconfigured using the satellite command(s).

26 Claims, 7 Drawing Sheets

(56) References Cited

U.S. PATENT DOCUMENTS

| | | | |
|---|---|---|---|
| 2014/0092804 A1* | 4/2014 | Scott | H04B 7/18515 |
| | | | 370/316 |
| 2016/0037434 A1 | 2/2016 | Gopal | |
| 2017/0339144 A1 | 11/2017 | Han | |
| 2018/0219868 A1* | 8/2018 | Nadeau | G06F 21/604 |
| 2019/0237868 A1* | 8/2019 | Fang | H01Q 25/00 |
| 2019/0239090 A1 | 8/2019 | Walker | |
| 2020/0322045 A1* | 10/2020 | Scott | H04B 7/18543 |
| 2021/0027260 A1* | 1/2021 | Dent-Young | H04L 63/0823 |

OTHER PUBLICATIONS

Barritt Brian et al: "Loon SDN: Applicability to NASA's next-generation space communications architecture", 2018 IEEE Aerospace Conference, IEEE, Mar. 3, 2018 (Mar. 3, 2018), pp. 1-9, XP033365389, DOI: 10.1109/AERO.2018.8396643.
International Search Report and Written Opinion of the International Searching Authority for related PCT application No. PCT/US2021/037239 dated Oct. 29, 2021, 19 pages.

* cited by examiner

```xml
<?xml version="1.0" ?>
<rpcs>
<rpc name="gatewayToSatellite" procs ="4">
<proc name="3_8_Task1_Ku-S_Rcvr_Power" order="1" inputs="2" outputs="0">
    <inputs>
        <input name="State" type="string" required="true" yangXPath="/k:input/k:lna/k:component-state"/>
        <input name="Conv" type="int" required="true" yangXPath="/k:input/k:lna/k:component-number"/>
    </inputs>
</proc>
<proc name="3_19_Task2_Set_Ku-S_Receiver_Switch_Position" order="2" inputs="3" outputs="0">
    <inputs>
        <input name="Conv" type="int" required="true" yangXPath="/k:input/k:baseball-switch/k:component-number"/>
        <input name="SwPos" type="string" required="true" yangXPath="/k:input/k:baseball-switch/k:switch-position"/>
        <input name="ECM" type="string" required="true" yangXPath="/k:input/k:baseball-switch/k:ecm"/>
    </inputs>
</proc>
<proc name="3_9_Task1_S_BB_Downconv_Power" order="3" inputs="3" outputs="0">
    <inputs>
        <input name="State" type="string" required="true" yangXPath="/k:input/k:baseball-switch/k:component-state"/>
        <input name="LO" type="string" required="true" yangXPath="/k:input/k:baseball-switch/k:oscillator-input"/>
        <input name="Conv" type="int" required="true" yangXPath="/k:input/k:baseball-switch/k:component-number"/>
    </inputs>
</proc>
<proc name="3_19_Task1_Set_S-BB_Downconverter_Input_Switch_Position" order="4" inputs="3" outputs="0">
    <inputs>
        <input name="LO" type="string" required="true" yangXPath="/k:input/k:baseball-switch/k:oscillator-input"/>
        <input name="Conv" type="int" required="true" yangXPath="/k:input/k:baseball-switch/k:component-number"/>
        <input name="SwPos" type="string" required="true" yangXPath="/k:input/k:baseball-switch/k:switch-position"/>
    </inputs>
</proc>
</rpc>
</rpcs>
```

FIG. 5

SOFTWARE-BASED ORCHESTRATION OF COMMUNICATION PAYLOADS IN SATELLITES

CROSS-REFERENCE TO RELATED APPLICATIONS

The present application claims priority to U.S. Provisional Patent App. No. 63/039,218, filed on Jun. 15, 2020, which is hereby incorporated herein by reference as if set forth in full.

The present application is related to International Patent App. No. PCT/US2020/065351, filed on Dec. 16, 2020, which claims priority to U.S. Provisional Patent App. No. 62/948,599, filed on Dec. 19, 2019, which are both hereby incorporated herein by reference as if set forth in full.

BACKGROUND

Field of the Invention

The embodiments described herein are generally directed to software-based orchestration of communication payloads in satellites, and, more particularly, to providing and supporting the Yet Another Next Generation (YANG) data modeling language and similar modeling languages for software-defined networking (SDN) of communication payloads in orbital satellites.

Description of the Related Art

SDN is an approach to network management that uses software-based network configuration to improve network performance and monitoring. It represents a shift from the static and decentralized architecture of traditional networks to a dynamic and more centralized architecture that provides more flexibility. SDN started with Local Area Networks (LANs) and expanded to Wide Area Networks (WANs) and WAN underlays, such as Multi-Protocol Label Switching (MPLS) networks and optical networks. SDN is also at the heart of 5G systems for mobile services. Thus, terrestrial telecommunication systems are now dynamically managed. This enables the provisioning of new services via software-based orchestration systems, and the management and optimization of network performance and throughput by an SDN controller.

YANG is an example of a data modeling language for defining data sent over network management protocols. It is managed by the network modeling (NETMOD) working group in the Internet Engineering Task Force (IETF) and was first published as RFC 6020 in October 2010. While YANG was originally designed for the Network Configuration Protocol (NETCONF), it is currently protocol-independent. In other words, YANG can be used to model configuration and state data of network elements, in a manner that can be converted into any encoding format, including eXtensible Markup Language (XML) and JavaScript Object Notation (JSON), for use with any desired network configuration protocol. Thus, YANG is well-suited to model the configuration and state data for SDN and Virtual Network Functions (VNF).

The terrestrial information technology (IT) and telecommunications industries use YANG to model the configurations of their equipment and networks. The use of YANG is the reason why any terrestrial SDN orchestrator or controller can manage any piece of network equipment, regardless of its manufacturer. Generally, the same YANG-based model is utilized throughout all levels of the software stack and management chain of SDN.

These industries also developed NETCONF and a RESTful implementation of NETCONF (RESTCONF) as standard protocols to communicate YANG-based models to and from the SDN-enabled equipment. Such protocols, in conjunction with YANG, enable the telecommunications industry to hand off services between different service providers.

It would be beneficial if satellite-based services could leverage this device agnosticism and flexibility in terrestrial communication networks. However, there is currently no easy means for doing so.

SUMMARY

Accordingly, systems, methods, and non-transitory computer-readable media are disclosed for software-based orchestration of communication payloads in satellites.

In an embodiment, a method comprises using at least one hardware processor to: receive a payload model of a satellite payload in a satellite orbiting Earth, wherein the payload model is defined in a data modeling language, such as Yet Another Next Generation (YANG), and wherein the payload model represents a configuration for the satellite payload, wherein the satellite payload comprises one or more components, and wherein the configuration specifies a setting for at least one of the one or more components; translate the payload model into one or more satellite commands for configuring the satellite payload according to the configuration represented in the payload model; and reconfigure the satellite payload using the one or more satellite commands. The at least one hardware processor may be comprised in a ground control system, wherein reconfiguring the satellite payload comprises transmitting the one or more satellite commands to the satellite orbiting Earth. Alternatively, the at least one hardware processor may be comprised in the satellite, wherein the payload model is received via transmission from a ground control system. The method may further comprise using the at least one hardware processor to: receive telemetry from the satellite orbiting Earth; and translate the telemetry into the payload model.

The method may further comprise using a network planning system (e.g., service orchestrator system) to: receive a service model of a service, wherein the service model is defined in the YANG data modeling language; generate one or more network models based on the service model, wherein each of the one or more network models represents a network, and is defined in the YANG data modeling language, and wherein each of the one or more network models comprises satellite payload information to enable service provisioning; and send at least one of the one or more network models to a control system in a network represented by the at least one network model. The method may further comprise using the control system in the network to: receive the at least one network model; generate one or more device models based on the at least one network model, wherein each of the one or more device models represents a configuration of a network device in the network represented by the at least one network model, and is defined in the YANG data modeling language; and send at least one of the one or more device models to a network device represented by the at least one device model. The service model may be received from an operations and business support system. The method may further comprise using the network planning system to communicate with a network planning system in another domain. The other domain may be a terrestrial communications domain.

Reconfiguring the satellite payload may comprise provisioning the satellite payload for at least one new service, changing at least one existing service of the satellite payload, and/or terminating (e.g., tearing down) at least one existing service of the satellite payload. The payload model may further represent one or more capabilities of the satellite payload and one or more procedures for configuring the satellite payload to support one or more services. The payload model may comprise a representation of a digital switch matrix or channelizer of the satellite payload, a representation of one or more radio frequency (RF) components of the satellite payload, and a representation of one or more connections between the digital switch matrix or channelizer and the one or more RF components. The payload model may comprise a remote procedure call that updates a configuration of the digital switch matrix or channelizer. The payload model may comprise a remote procedure call that accounts for changes in state and redundancy of the one or more RF components. The payload model may comprise a remote procedure call that retrieves a state of one or more components of the satellite payload. The payload model may comprise a remote procedure call that accesses one or more telemetry functions of the satellite payload. The payload model may comprise a representation of a phased array antenna as a plurality of antenna elements. Each representation of one of the plurality of antenna elements may comprise a representation of one or more beams, wherein each representation of a beam represents one or more of a beam direction, minimum frequency, maximum frequency, power, gain, or normalized beam pattern. The payload model may comprise a representation of an analog-to-digital converter, a switch or a router (e.g., at the digital intermediate frequency (IF) or Internet Protocol (IP) packet level), and a digital-to-analog converter.

The payload model may comprise a remote procedure call that updates the configuration for the satellite payload, and translating the payload model into one or more satellite commands may comprise: receiving a call to the remote procedure call, wherein the call is formatted in eXtensible Markup Language (XML); accessing a translation XML document that maps the remote procedure call to one or more satellite command and control (C2) procedures; and communicating the C2 procedures to a satellite C2 system that communicatively links with the satellite.

The method may further comprise using the at least one hardware processor to: update the payload model (or generate a new payload model) to represent one or more of a current status, current configuration, or current performance of the satellite payload; and send the updated (or newly generated) payload model to a network planning system. The method further comprise using the network planning system to coordinate at least one service provided by the satellite payload with at least one service provided by one or more other network devices within a network, based on the payload model and a model, defined in the YANG data modeling language, of each of the one or more other network devices.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 is an example of a portion of an XML document that defines a translation between a YANG-based RPC and satellite command and control procedures, according to an embodiment.

DETAILED DESCRIPTION

In an embodiment, systems, methods, and non-transitory computer-readable media are disclosed for software-based orchestration of communication payloads in satellites. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Processing Device

Figure 1:
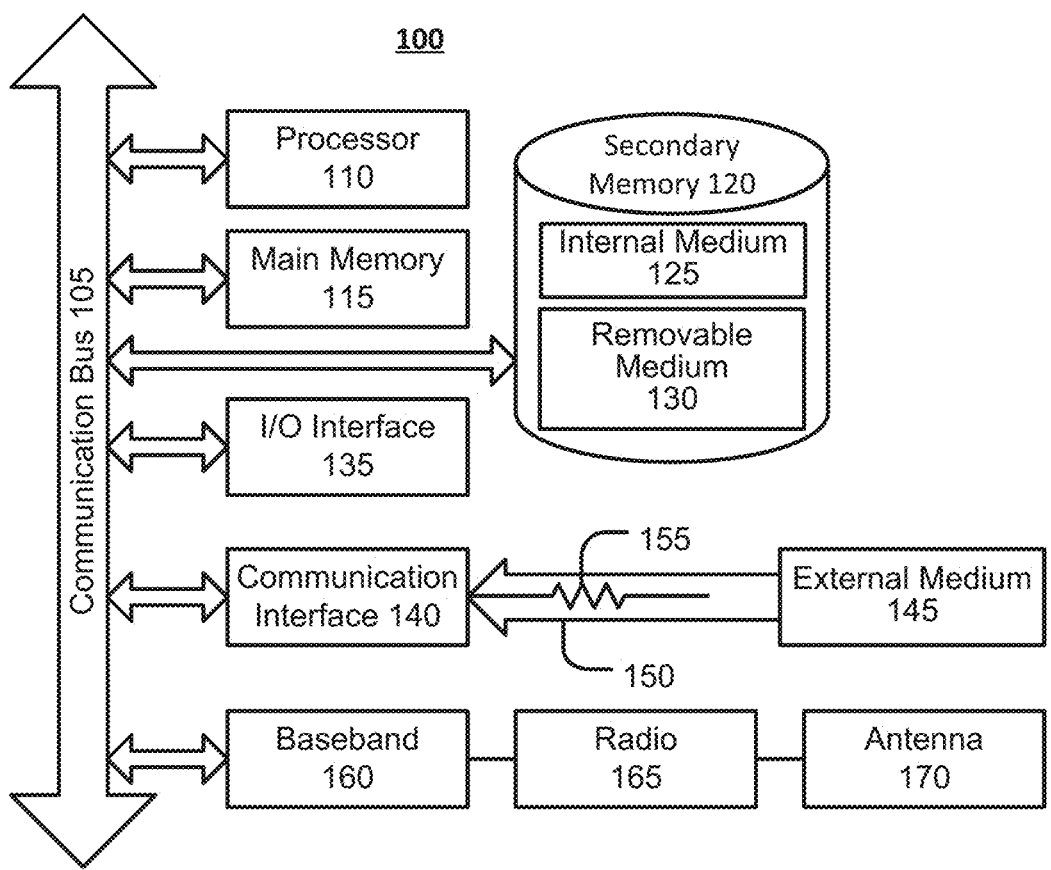
FIG. 1 illustrates an example processing system, by which one or more of the processes described herein, may be executed, according to an embodiment.

FIG. 1 is a block diagram illustrating an example wired or wireless system 100 that may be used in connection with various embodiments described herein. For example, system 100 may be used to execute one or more of the functions, processes, or methods described herein (e.g., to store and/or execute one or more software modules). System 100 can be a server (e.g., acting as a service orchestrator or SDN controller), a personal computer (e.g., desktop, laptop, or tablet computer), a mobile device (e.g., smartphone), a controller, a satellite payload, an onboard controller in a satellite, or any other processor-enabled device that is capable of wired or wireless data communication. Other computer systems and/or architectures may be also used, as will be clear to those skilled in the art.

System 100 preferably includes one or more processors, such as processor 110. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 110. Examples of processors which may be used with system 100 include, without limitation, the Pentium® processor, Core i7® processor, and Xeon® processor, all of which are available from Intel Corporation of Santa Clara, Calif.

Processor 110 is preferably connected to a communication bus 105. Communication bus 105 may include a data channel for facilitating information transfer between storage and other peripheral components of system 100. Furthermore, communication bus 105 may provide a set of signals used for communication with processor 110, including a data bus, address bus, and/or control bus (not shown). Communication bus 105 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 100 preferably includes a main memory 115 and may also include a secondary memory 120. Main memory 115 provides storage of instructions and data for programs executing on processor 110, such as one or more of the functions, processes, and/or modules discussed herein. It should be understood that programs stored in the memory and executed by processor 110 may be written and/or compiled according to any suitable language, including without limitation C/C++, Java, JavaScript, Perl, Visual Basic, .NET, and the like. Main memory 115 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 120 may optionally include an internal medium 125 and/or a removable medium 130. Removable medium 130 is read from and/or written to in any well-known manner. Removable storage medium 130 may be, for example, a magnetic tape drive, a compact disc (CD) drive, a digital versatile disc (DVD) drive, other optical drive, a flash memory drive, and/or the like.

Secondary memory 120 is a non-transitory computer-readable medium having computer-executable code (e.g., software modules implementing disclosed processes and/or data flows) and/or other data stored thereon. The computer software or data stored on secondary memory 120 is read into main memory 115 for execution by processor 110.

In alternative embodiments, secondary memory 120 may include other similar means for allowing computer programs or other data or instructions to be loaded into system 100. Such means may include, for example, a communication interface 140, which allows software and data to be transferred from external storage medium 145 to system 100. Examples of external storage medium 145 may include an external hard disk drive, an external optical drive, an external magneto-optical drive, and/or the like. Other examples of secondary memory 120 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 100 may include a communication interface 140. Communication interface 140 allows software and data to be transferred between system 100 and external devices (e.g. printers), networks, or other information sources. For example, computer software or executable code may be transferred to system 100 from a network server via communication interface 140. Examples of communication interface 140 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 100 with a network or another computing device. Communication interface 140 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 140 are generally in the form of electrical communication signals 155. These signals 155 may be provided to communication interface 140 via a communication channel 150. In an embodiment, communication channel 150 may be a wired or wireless network, or any variety of other communication links. Communication channel 150 carries signals 155 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as software modules implementing disclosed processes and/or data flows) is stored in main memory 115 and/or secondary memory 120. Computer programs can also be received via communication interface 140 and stored in main memory 115 and/or secondary memory 120. Such computer programs, when executed, enable system 100 to perform the various functions of the disclosed embodiments as described elsewhere herein.

In this description, the term "computer-readable medium" is used to refer to any non-transitory computer-readable storage media used to provide computer-executable code and/or other data to or within system 100. Examples of such media include main memory 115, secondary memory 120 (including internal memory 125, removable medium 130, and/or external storage medium 145), and any peripheral device communicatively coupled with communication interface 140 (including a network information server or other network device). These non-transitory computer-readable media are means for providing executable code, programming instructions, software, and/or other data to system 100.

In an embodiment that is implemented using software, the software may be stored on a computer-readable medium and loaded into system 100 by way of removable medium 130, I/O interface 135, or communication interface 140. In such an embodiment, the software is loaded into system 100 in the form of electrical communication signals 155. The software, when executed by processor 110, preferably causes processor 110 to perform one or more of the processes and functions described elsewhere herein.

In an embodiment, I/O interface 135 provides an interface between one or more components of system 100 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device, in the console of a vehicle, etc.).

System 100 may also include optional wireless communication components that facilitate wireless communication over a voice network and/or a data network. The wireless communication components comprise an antenna system 170, a radio system 165, and a baseband system 160. In such an embodiment, radio frequency (RF) signals are transmitted and received over the air by antenna system 170 under the management of radio system 165.

In an embodiment, antenna system 170 may comprise one or more antennae and one or more multiplexors (not shown) that perform a switching function to provide antenna system 170 with transmit and receive signal paths. In the receive path, received RF signals can be coupled from a multiplexor to a low noise amplifier (not shown) that amplifies the received RF signal and sends the amplified signal to radio system 165.

In an alternative embodiment, radio system 165 may comprise one or more radios that are configured to communicate over various frequencies. In an embodiment, radio system 165 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 165 to baseband system 160.

If the received signal contains audio information, then baseband system 160 may decode the signal and convert it to an analog signal. Then, the signal is amplified and sent to a speaker. Baseband system 160 may also receive analog audio signals from a microphone. These analog audio signals may be converted to digital signals and encoded by baseband system 160. Baseband system 160 can also encode the digital signals for transmission and generate a baseband transmit audio signal that is routed to the modulator portion of radio system 165. The modulator mixes the baseband transmit audio signal with an RF carrier signal, generating an RF transmit signal that is routed to antenna system 170 and may pass through a power amplifier (not shown). The power amplifier amplifies the RF transmit signal and routes it to antenna system 170, where the signal is switched to the antenna port for transmission.

Baseband system 160 may also be communicatively coupled with processor 110, which may be a central processing unit (CPU). Processor 110 has access to data storage areas 115 and 120. Processor 110 is preferably configured to execute instructions (i.e., computer programs, such as software modules implementing disclosed processes and/or data flows) that can be stored in main memory 115 or secondary memory 120. Computer programs can also be received from baseband processor 160 and stored in main memory 110 or in secondary memory 120, or executed upon receipt. Such computer programs, when executed, enable system 100 to perform the various functions of the disclosed embodiments.

2. Evolution of Satellite Payload Operations

Traditionally, legacy satellite payload operations are relatively static. In other words, the configuration of the payload is set once and rarely changed. Generally, changes only occur when a change to a business model or an equipment failure in the payload requires a reconfiguration of the satellite payload. In these rare instances, reconfigurations must be planned in advance and are typically manually executed. At the very least, a human must be kept in the loop during the reconfiguration process.

However, the designs of satellite payloads have changed over recent years, to allow more dynamic operations and to provide more data bandwidth and/or service, where needed, within the respective coverage area. For example, many high-throughput satellite (HTS) payloads comprise phased array antennas and highly configurable channelizers, which are both more software-defined, and therefore, provide more flexibility and adaptability than legacy architectures. As a result, it has become possible for a satellite to change or reconfigure its payload multiple times a day, even to the point of being able to respond to changes in network traffic. The challenge is that changes in a satellite must be coordinated and made in conjunction with the rest of the network equipment that support the services being provided through the satellite.

3. Infrastructure for Modeling Satellites

In an embodiment, satellite payloads are modeled using YANG. For example, the configuration and/or state of satellite payloads within one or more networks may be modeled using YANG as the data modeling language. As used herein, the satellite payload refers to equipment onboard a satellite orbiting Earth. This equipment may comprise, for example, communications antennas (e.g., parabolic, phased array, phase feed array, lasers, etc.), receivers, amplifiers (e.g., low noise amplifiers (LNAs), traveling wave tube amplifiers (TWTAs), etc.), linearizers, RF filters, input and output multiplexers, combiners, dividers, waveguide and coax, frequency converters, analog-to-digital convertors, digital-to-analog converters, RF switches, intermediate frequency (IF) switches, matrix switches, Internet Protocol (IP) switches, IP routers, signal monitoring sensors, passive RF devices, channelizers, electro-optical sensors, RF sensors, infrared sensors, optical sensors, weather sensors, and/or other circuitry. Any one or more of these components may be modeled in YANG as a representation within a "YANG model" or within another payload model defined in another data modeling language. As used herein, the term "payload model" may refer to a model of a satellite payload, defined in YANG (i.e., a "YANG model") or in any other data modeling language.

While YANG is discussed herein as the data modeling language to be used, it should be understood that other data modeling languages could be used. Any of the techniques used herein could be converted or adapted to other data modeling languages. Thus, embodiments may utilize a data modeling language other than YANG. In addition, while a specific version of YANG is used for examples herein, any past or future version or release of YANG may be used instead. Thus, as used herein, the term "YANG" should be understood to encompass any past or future version or release of the YANG modeling language. Ideally, the data modeling language used should be the same as the data modeling language used in any other domain(s) (e.g., terrestrial communications) with which the satellite domain is to interface. This enables data to freely flow between the two or more domains, even when the systems are regularly reconfiguring to optimize the overall system performance.

Figure 2:
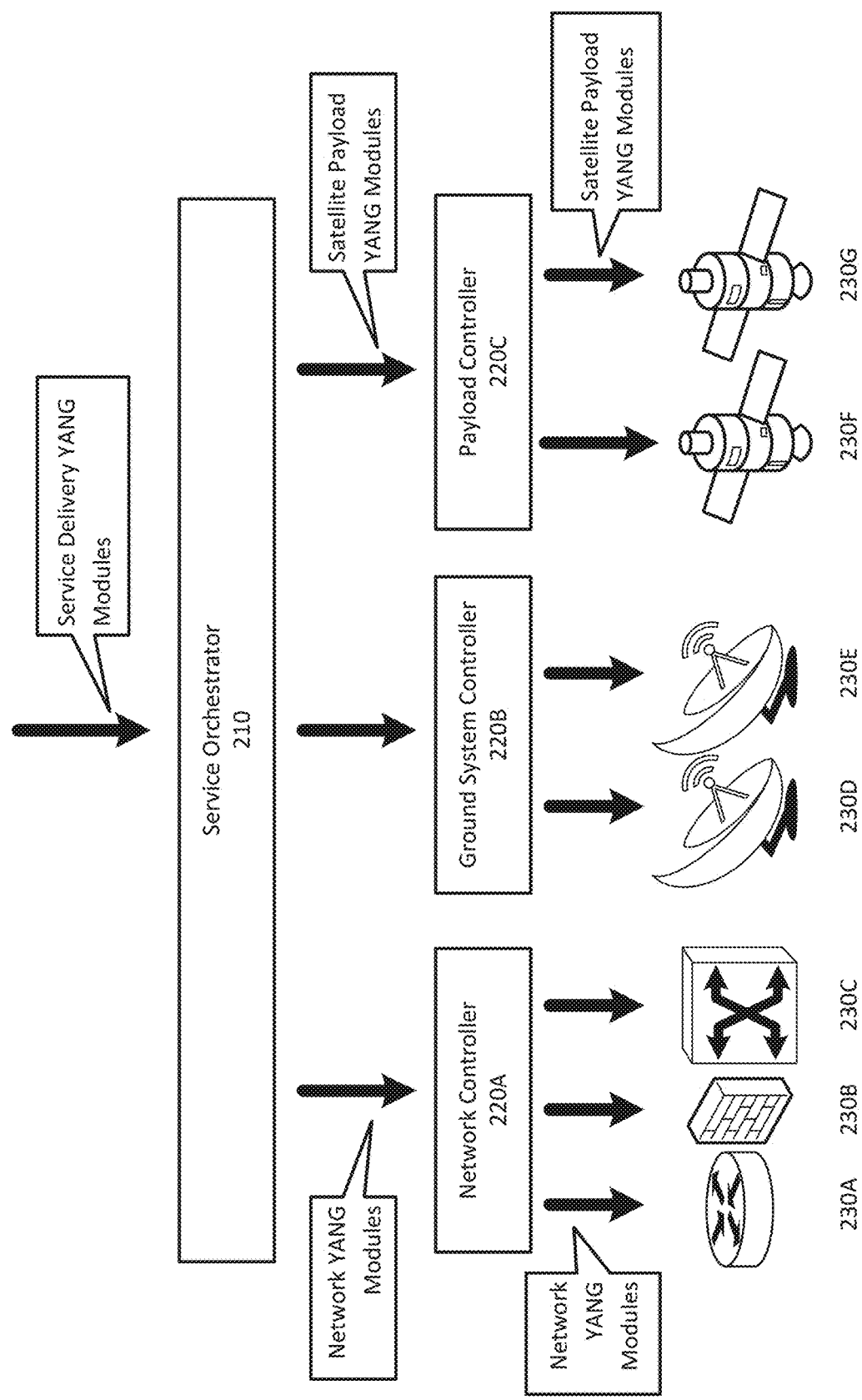
FIG. 2 illustrates a general infrastructure for SDN orchestration, according to an embodiment.

FIG. 2 illustrates the general infrastructure for SDN orchestration, according to an embodiment. Preferably, the infrastructure of a satellite-based network should mirror that of a typical SDN implementation from top to bottom. In particular, a service orchestration system 210 (e.g., one or more servers) receives YANG models for service delivery, and uses those models to provide YANG models of networks to SDN controllers 220 (e.g., one or more servers). In turn, SDN controllers 220 use the network YANG models to provide YANG models of network elements to network elements 230 (e.g., one or more servers, devices, ground stations, satellites, or other network components). Each network element 230 loads the YANG model, and converts the YANG model to one or more commands that implement the configuration specified in the YANG model. Each network element 230 also reads status, configuration, and/or performance information (e.g., current information), updates the YANG model for the network element 230, and passes the updated YANG model back up the chain (e.g., to SDN controller 220, which provides the updated YANG model to service orchestration system 210 or other network planning system). As used herein, the term "model" should be understood to refer to a data structure comprising definitions for one or more parameters (e.g., constants, variables, etc.), functions (e.g., remote procedure calls), other data structures, mappings, and/or the like, which can be represented in source code, object code, parameterized code (e.g., XML, JSON, etc.), and/or any other electronic representation.

In an embodiment, each satellite payload, and more specifically, the elements of the satellite payload and their connections, are modeled using YANG. The modeled satellite payload is then provided from a satellite command and control (C2) system to a network planning system, such as service orchestrator 210, and SDN controllers 220. This enables the satellite payload to be orchestrated for service provisioning and tear-down by service orchestrator 210 and/or SDN controller 220. It also enables software to be defined for real-time network performance optimization of the satellite payload, along with and as part of the rest of the network.

In addition, the YANG model of a satellite payload enables the satellite to be seamlessly integrated into a larger hybrid network (e.g., comprising multiple satellites of different types, a combination of satellites and terrestrial telecommunications systems, etc.). To service orchestrator 210 and SDN controllers 220, the satellite payload will look like any other network device (e.g., switch, router, etc.), rather than a separate, non-integrated satellite payload, and can be configured like any other network device, rather than having to be specially configured. This also enables a single orchestrator 210 and SDN controller 220 to seamlessly manage an entire fleet of satellites with different payloads and/or different orbits, by allowing all satellites to be described using a YANG model, regardless of make or manufacturer. It also allows that same orchestrator 210 to manage the associated ground networks using the same type of SDN controllers 220, YANG models, and operational concepts, resulting in a fully orchestrated network operation that includes the satellite payloads themselves.

In other words, the network planning system (e.g., service orchestrator(s) 210) for an overall network (e.g., encompassing both terrestrial and satellite domains) can treat each satellite payload as just another network device within the overall network. Each network device, including the satellite payload, may be modeled in the same data modeling language (e.g., YANG), so that all network devices can be managed in the same or similar manner by the network planning system. Thus, the network planning system can seamlessly coordinate service(s) provided by satellite payloads within the network with service(s) provided by other network devices within the network. Advantageously, the network planning system can be device-agnostic, such that satellite payloads and other network devices, including ground network devices (e.g., in the terrestrial domain), can be treated the same during planning. This is in contrast to conventional systems in which the services provided by satellites must be planned and controlled separately from the rest of the network.

In an embodiment, each YANG model of a satellite payload describes the particular capabilities of the satellite payload, the current configuration of that satellite payload, and the procedure(s) for configuring the satellite payload to support one or more services. YANG modeling can work with all types of communications payloads, including fixed-satellite service (FSS) wide-beam payloads, first-generation HTS payloads, more advanced software-defined payloads with channelized-based and/or phase-array-based antennas and/or wideband RF payloads, and/or demod/remod payloads, the satellites' command and telemetry systems, and/or the mission data processing systems used on Earth-resource, weather, and/or other non-communication satellites.

Since YANG models have never been created for satellite components, in an embodiment, software modules are created to convert elements of the YANG models, representing satellite payloads, to the commands to and from the telemetry for the satellite. Thus, the unique features of the satellite will either be hidden from service orchestrator 210 and SDN controllers 220, or included in the models to enable the SDN and service orchestrator 210 to configure and operate the satellite payload effectively.

In an embodiment, the YANG model for each satellite payload addresses/incorporates one or more of the following:

- The need for an inventory of all components, configuration, and state of the satellite payload. For example, the digital switch matrix of the satellite payload may be modeled by its component parts (e.g., slice, port, channel), and the RF components of the satellite payload may be modeled with the understanding of component adjacencies and redundancies (e.g., antenna (dish, phased array, etc.), low noise amplifier (LNA), up/down converter, amplifier, analog-to-digital converter (ADC), digital-to-analog converter (DAC), carrier, baseball switch, etc.).
- The collection and/or specification of performance metrics or other attributes from the satellite payload. For example, for RF components, attributes that may be collected or set may comprise gain, loss, frequency response, group delay, and/or the like. As another example, the attributes may comprise the output of one or more sensors, such as an electro-optical (EO) sensor or RF sensor. This information can be used to define the characteristics and performance of the components of the satellite payload.
- The identification of controls that are available for components of the satellite payload. For example, for an amplifier in the satellite payload, the controls may comprise setting the amplifier's gain, setting the amplifier's operating mode, and/or the like.
- The relationship between RF components and the input/output of the digital switch matrix to understand potential signal/service flow through the system.

A routing function (e.g., a remote procedure call (RPC)) to allow the configuration of the routing functions (e.g., baseball switches, digital switch matrices, channelizers, etc.) to be updated.

A component swap function (e.g., RPC) to account for changes in state and redundancy of RF components.

Component state and telemetry functions (e.g., RPC) for situational awareness, component capabilities, constraints, and/or performance characteristics.

In an embodiment, phased array antennas in a satellite payload may be modeled as a plurality of antenna elements. Each antenna element has a phase shift and an attenuation setting used to produce a number of beams. Each beam may be individually modeled to have a direction, a minimum and maximum frequency, a power and gain of the beam's center, and/or a normalized beam pattern. The antenna array matrix switch (AAMS) may be modeled to include the connections between beams and RF components (e.g., power amplifiers, LNAs, etc.). Each AAMS connection ties one or more beams to an RF component identifier. If the connection is frequency-limited, a minimum and maximum frequency, as well as any other limitations (e.g., maximum number of beams), may also be modeled.

Figure 3A:
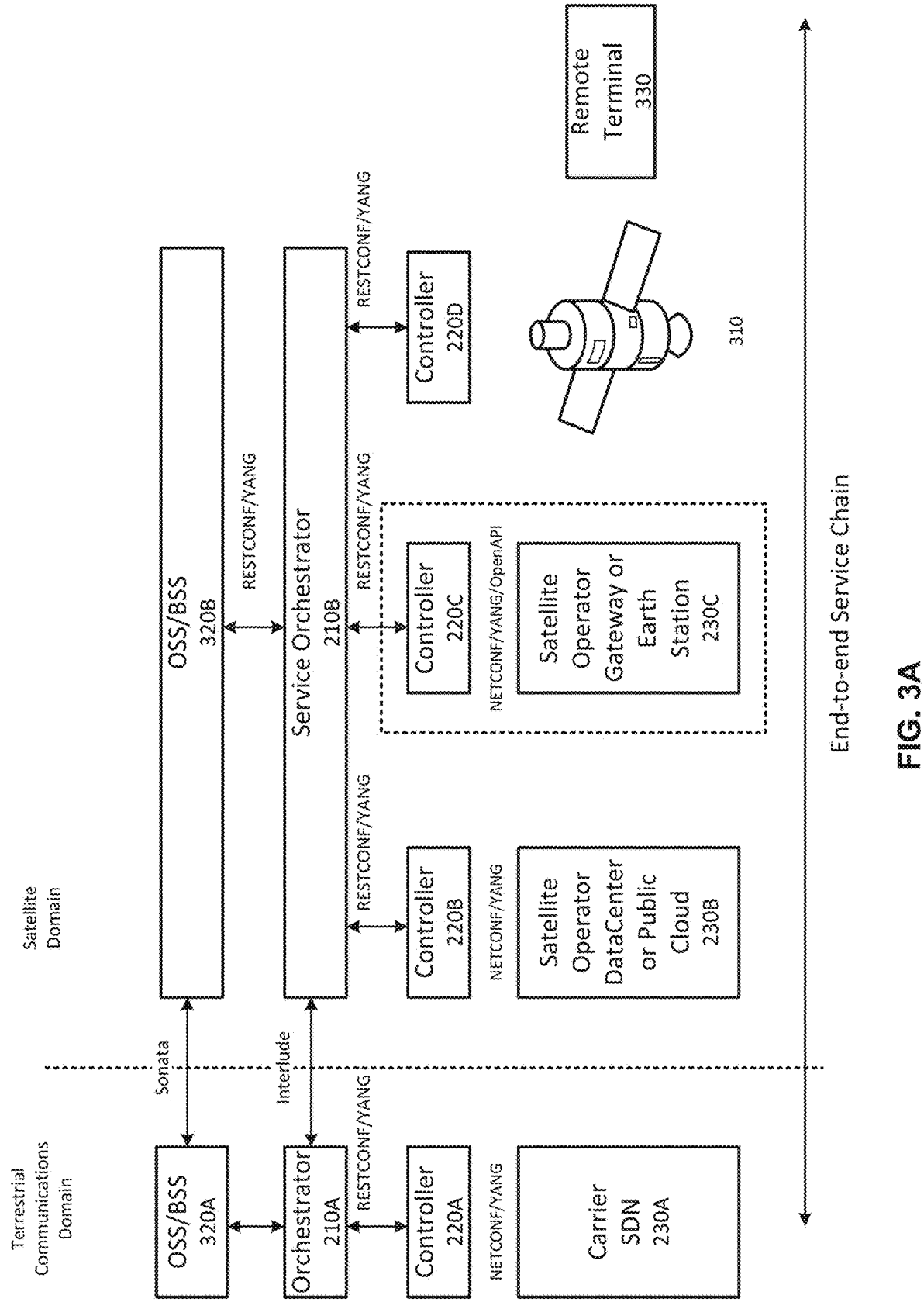
FIGS. 3A-3C illustrate specific infrastructures and data flows for software-based orchestration of satellite payloads, according to an embodiment.

FIG. 3A illustrates a simple end-to-end service chain, using a YANG model for a satellite payload, according to an embodiment. Services may be coordinated between a domain for terrestrial communications (e.g., one or more cellular and/or fiber networks operated by one or more terrestrial carriers) and the domain for satellite communications (e.g., one or more satellites 310 operated by one or more satellite operators). Each domain comprises at least one service orchestrator 210 and at least one SDN controller 220 for one or more network elements 230. In addition, each domain comprises at least one operations support system (OSS) and business support system (BSS), collectively referred to herein as OSS/BSS 320. The OSS/BSS 320 in each domain may communicate with the OSS/BSS 320 in the other domain using Sonata, promulgated by the Metro Ethernet Forum (MEF). Sonata is a set of application programming interfaces (APIs), based on the Lifecycle Service Orchestration (LSO) reference architecture, that enable frictionless inter-provider service automation. In addition, the service orchestrator 210 in each domain may communicate with the service orchestrator 210 in the other domain using Interlude. Interlude belongs to the family of LSO Interface Reference Points, and provides a connection between the OSS functions of the two domains, in parallel with Sonata.

Within each domain, OSS/BSS 320 may communicate with service orchestrator 210, and service orchestrator 210 may communicate with each controller 220, using RESTCONF as the network management protocol and using YANG to define the data communicated via RESTCONF. Controllers 220 may communicate with network elements 230 (e.g., a carrier SDN 230A in the terrestrial telecommunications domain, and a satellite operator's (e.g., Intelsat™) or third party's datacenter or public cloud 230B and a satellite operator's gateway or Earth station 230C in the satellite domain), using NETCONF as the network management protocol and using YANG to define the data communicated via NETCONF. Communications between controller 220C and the satellite operator's gateway or Earth station 230C may be implemented based on the OpenAPI specification.

The satellite domain (as well as the terrestrial telecommunications domain) will also usually comprise a remote terminal 330. Remote terminal 330 may comprise a multi-access edge computing (MEC) appliance. MEC is a network architecture concept, defined by the European Telecommunications Standards Institute (ETSI), that enables cloud computing capabilities and an IT service environment at the edge of a network. An MEC appliance enables flexible and rapid deployment of new applications and services for customers at edge nodes of the network.

Figure 3B:
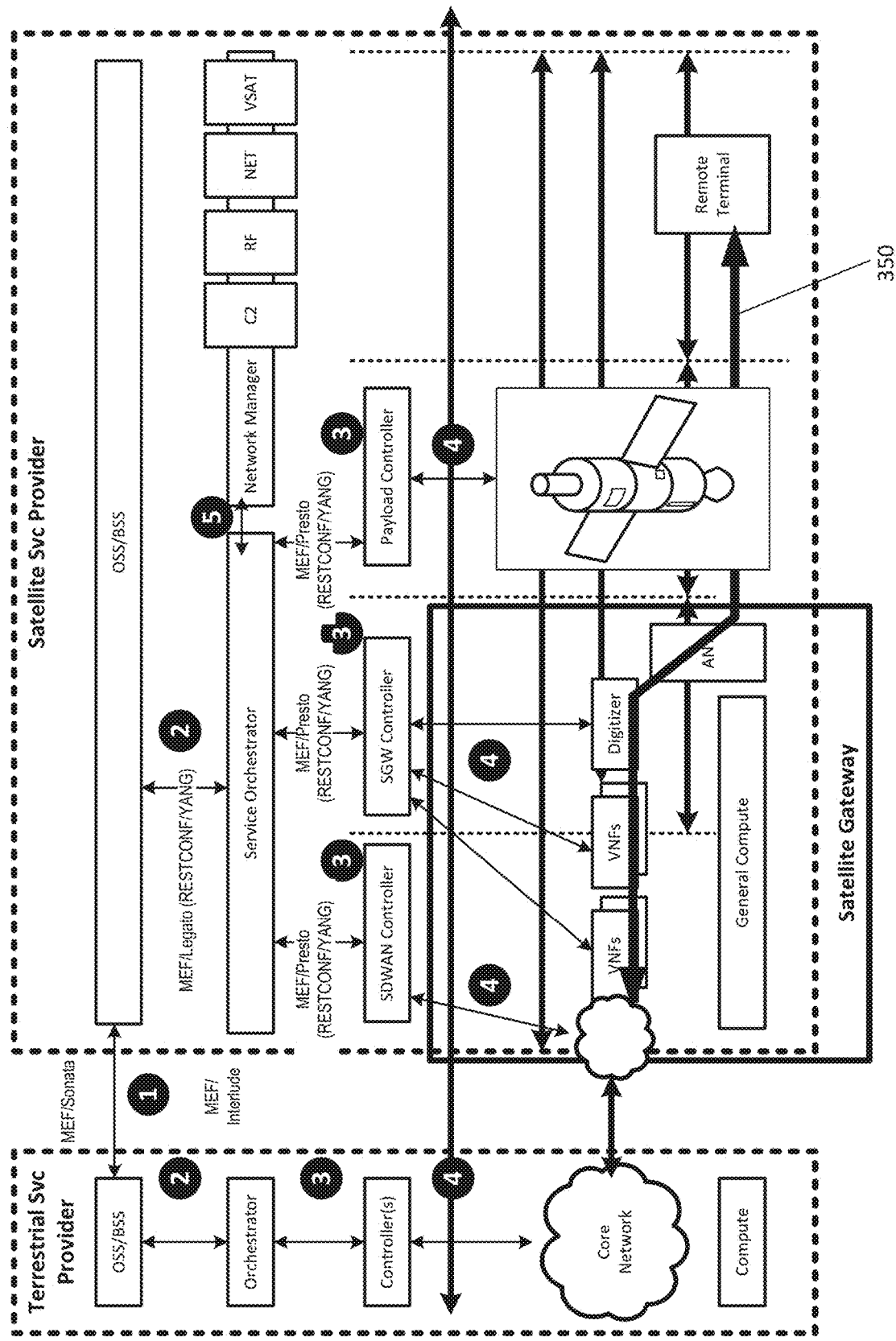

FIG. 3B illustrates an example data flow within the end-to-end service chain of FIG. 3A, according to an embodiment:

(1) Services are coordinated using the MEF Sonata APIs to communicate services, to be configured, between the OSS/BSS systems 320 of the terrestrial and satellite service providers' domains.

(2) Respective OSS/BSS systems 320 in each domain communicate a "service" YANG model, defining a service for their respective domains, to the respective service orchestrator 210 in each domain.

(3) Service orchestrators 210 in each domain (or a satellite resource manager in the terrestrial service provider's domain) communicate a "network" YANG model, defining a required network configuration, to respective controllers 220. In this particular example related to the satellite domain, service orchestrator 210B communicates with the SD-based controller 220B, satellite gateway (SGW) controller 220C, and the satellite payload controller 220D (and/or traditional monitor and control systems, network management systems, etc.). The communicated network YANG models may be based on the respective sub-domain of each controller 220 (e.g., WAN, gateway, and payload). In addition, service orchestrator 210B in the satellite domain comprises a payload-planner component that is responsible for RF path optimization and provides a "payload" YANG model, defining the satellite payload requirements, to satellite payload controller 220D.

(4) The respective controllers 220 (or traditional monitor and control systems, network management systems, etc.) communicate with devices (e.g., hardware modems, switches, RF combiners, RF dividers, etc.), physical network functions (PNFs), virtual network functions (VNFs), and/or satellite payloads in their sub-domains using device YANG models to properly configure each device or other element in the network, to create the desired service connections and performance. Thereby, the end-to-end service 350 is made available.

(5) Service orchestrator 210B in the satellite domain communicates updated satellite domain information (e.g., PNFs, VNFs, configuration of the satellite payload, etc.) to a network manager for monitoring and situational awareness.

Figure 3C:
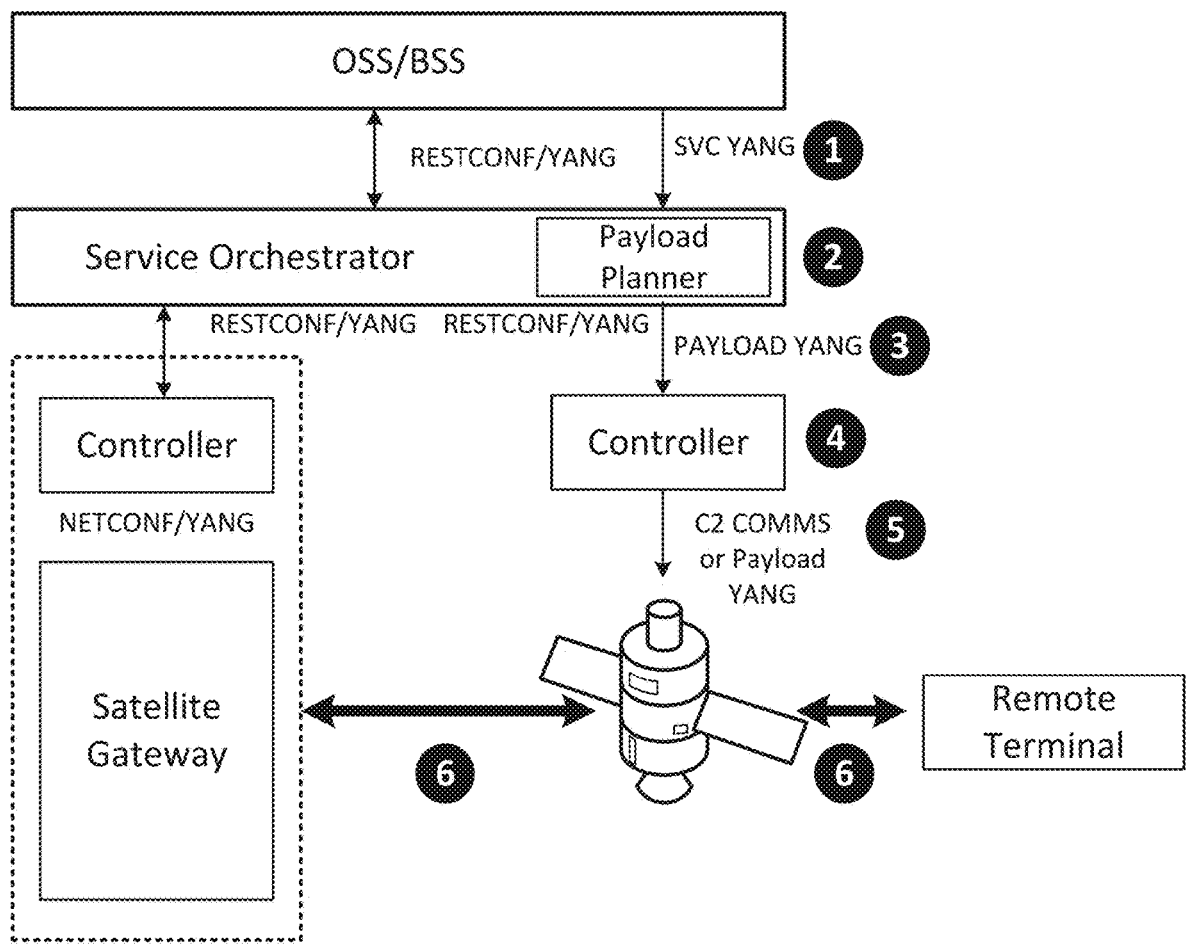

FIG. 3C illustrates the use of the payload YANG model in service provisioning, according to an embodiment:

(1) A service YANG model is provided to the payload-planner component of service orchestrator 210B in the satellite domain.

(2) The payload-planner component of service orchestrator 210B in the satellite domain generates a service optimization and transmission plan.

(3) The payload-planner component of service orchestrator 210B in the satellite domain communicates the payload YANG model to satellite payload controller 220D.

(4) Satellite payload controller 220D translates the payload YANG model into commands.

(5) Satellite payload controller 220D transmits the commands to satellite 310.

(6) Satellite 310 activates the service, represented by the commands, within the satellite's payload.

4. Modeling Satellites with YANG

In an embodiment, features and concepts that are unique to satellites are defined in YANG models to support service provisioning through the satellite, reconfiguration of the satellite payload, and interfacing with capacity planning. In this manner, the payload-planner component of the orchestration layer does not have to have any special knowledge of a given satellite, since it will gain all of the satellite-specific features, capabilities, and constraints from the YANG models themselves. This includes the RF performance parameters and models necessary to enable accurate link budgeting to be performed, to ensure service performance over a satellite link.

For example, virtual or physical devices may need to be defined for RF signals and carriers. These devices define the RF interface between the ground terminal antenna and the satellite antenna to enable correct calculation of the link budgets and proper modeling of the RF performance. The service parameters (e.g., both uplink and downlink RF carriers) may be created as part of the planning process and inserted into the service YANG model for each service. Satellite 310 is automatically configured, based on the service YANG model, such that the carrier is routed correctly with the correct link performance.

As another example, a unique YANG model may be defined for phased array antennas. The configuration for each element of the phased array is defined in this YANG model, so that satellite 310 can be configured correctly. In addition, the beam pattern and associated performance, which is needed and/or which results from the configuration of each antenna element, may be defined in this YANG model, to allow proper link budget calculations and RF performance modeling based on the phased array configuration. There also may need to be additional modeling to define performance and safety constraints on what constitutes an allowable configuration, to ensure the safety and safe operation of the satellite and its components.

As another example, RF performance YANG models may be defined for each active and inactive RF element in the system. This allows for accurate system planning and/or link budget calculations. For example, each YANG model may comprise performance parameters, such as gain/attenuation, frequency response, group delay, noise temperature, and/or the like, as required to calculate overall link performance. In addition, constraints associated with RF performance may be defined. Such constraints include, for example, co-channel and cross-polarization interference, linear and non-linear amplifier gain/effects, creation of inter-modulations, and/or the like.

As another example, YANG may be extended to model the total service link budget, including the ground-based systems. This may be done by defining YANG models for location, rain, and atmospheric models, and their associated path losses, and similarly defining ground-system performance using the same YANG model technique as used for the satellite, assuming that all other device performance information is available.

The translation between the payload YANG model and spacecraft commands and telemetry may be performed by either the ground-based control system or by satellite 310 itself. For example, controller 220D may execute software that performs the translation from payload YANG models to commands to be transmitted from the ground to satellite 310, and the translation from telemetry, received from satellite 310, to payload YANG models. Alternatively, an onboard processor (e.g., 110) of satellite 310 may perform the translation from payload YANG models, received from controller 220D, to commands to be executed by satellite 310, and the translation from telemetry to payload YANG models that are transmitted from orbit to controller 220D on the ground.

YANG modeling of the satellite communications systems (e.g., payload) enable service provisioning for all types of services, including, without limitation, communications services, Tracking, Telemetry, and Command (TT&C) services, mission downlink services (via direct downlink or indirect downlink via a communication satellite, from non-communication satellites, etc.), and/or the like. In addition, YANG modeling of satellite payloads allows common management of services across different satellite types, including satellites that are different in manufacturer, capacity, features, capabilities, orbits (e.g., low Earth orbit (LEO), medium Earth orbit (MEO), and Geostationary orbit (GEO)), and/or the like. The YANG modeling even enables common management of services that require multiple satellites, such as LEO to MEO/GEO and MEO/GEO to LEO relay services, LEO/MEO or GEO fleets with inter-satellite links, Earth orbit (EO) downlink services through a communications satellite, and/or the like.

5. XML-Based Translation

Figure 4:
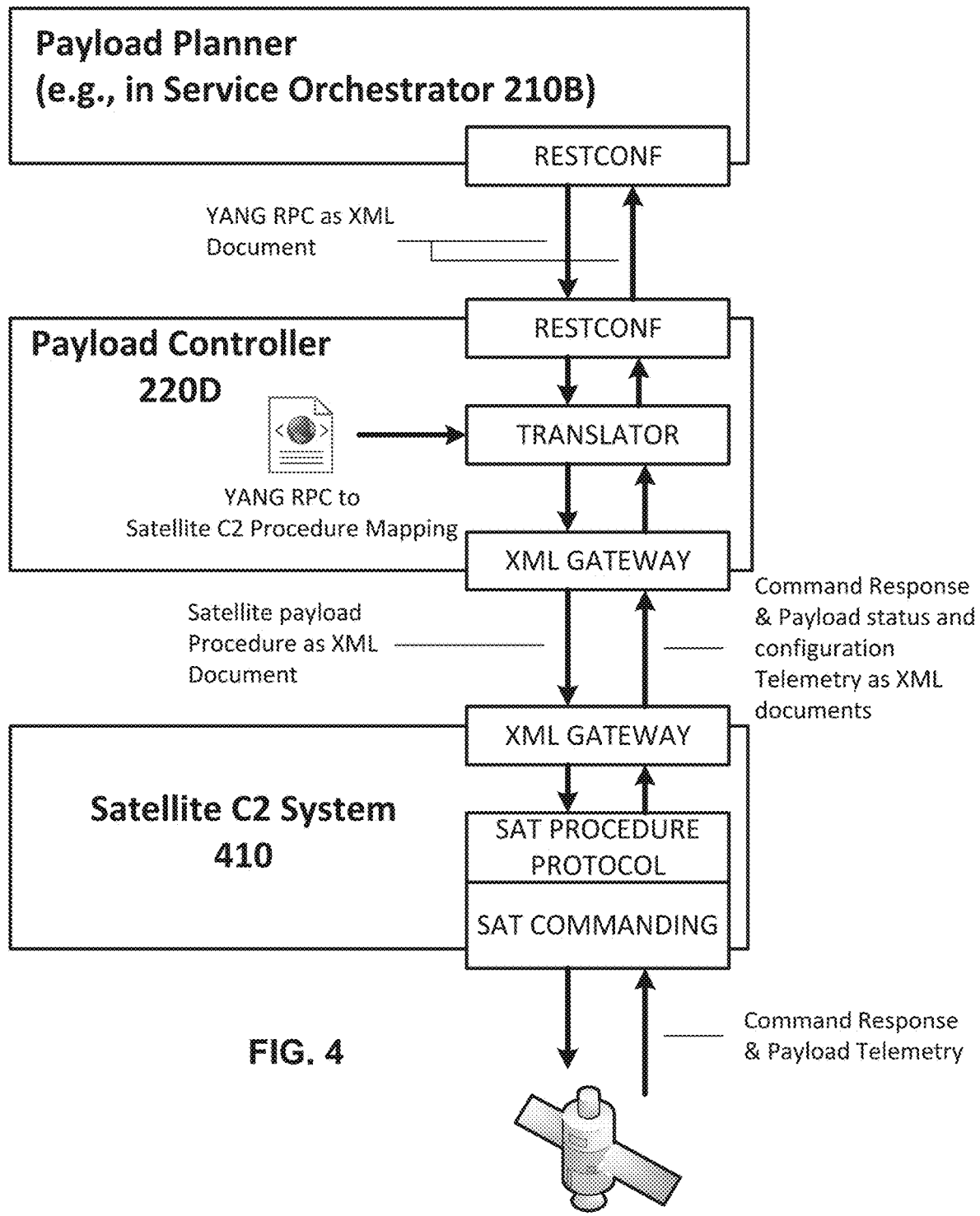
FIG. 4 illustrates an example data flow for software-based orchestration of a satellite payload, according to an embodiment.

FIG. 4 illustrates an example data flow for software-based orchestration of a satellite payload, according to an embodiment. In an embodiment, XML is used to facilitate translation, by satellite payload controller 220D, from RPC messages in the YANG model to the satellite C2 procedures that are used by a satellite C2 system 410 to provision and configure a satellite 310. For example, satellite C2 system 410 sends commands to one or more satellites 310 to change orbit, execute station-keeping procedures, and, in the case of programmable satellites 310, alter the payload configuration (e.g., payload control can be through the same RF link or a separate high-speed link). Satellite C2 systems 410 generally do not provide a NETCONF or RESTCONF interface and are not able to understand YANG models. Thus, in an embodiment, to effect a change in the payload of satellite 310, SDN-based satellite payload controller 220D translates YANG-based RPC commands that are expressed as XML documents, received from the payload planner of server orchestrator 210B, into either the native API of satellite C2 system 410 or the specific satellite procedures that satellite C2 system 410 sends to satellite 310.

A YANG-based RPC, transmitted using RESTCONF, can be formatted as XML or JSON. The following is an example of a RESTCONF call for a YANG-based RPC (e.g., "route-gw-to-sat"), formatted in XML, that creates a link between the satellite gateway on the ground (e.g., 230C) and the payload of satellite 310:

```
<input xmlns="urn:kratosspace:kratos-sat-payload">
    <lna>
        <component-number>01</component-number>
        <component-state>Active</component-state>
    </lna>
    <baseball-switch>
        <component-number>01</component-number>
```

```
    <switch-position>1-2_3-4</switch-position>
    <oscillator-input>F2</oscillator-input>
    <ecm>P</ecm>
  </baseball-switch>
</input>
```

The XML above details two RF components, an LNA and a baseball switch, and the settings that need to be configured for those two RF components. It should be understood that these components are simply representative components that have been selected to illustrate the translation of YANG-based RPC commands. Different components and combinations of components, including more complex components (e.g., switch matrices, channelizers, phased array antennas, etc.), and different settings and combinations of settings, can be handled in a similar manner.

The use of XML allows for the use of XPath for translation by satellite payload controller 220D. XPath is a query language for selecting nodes from an XML document. For example, the component number ("component-number") of the LNA in the XML above can be retrieved using the)(Path syntax "/k:input/k:lna/k:component-number", in which k defines the XML namespace (i.e., "xmlns").

Satellite C2 procedures vary between satellite manufacturers. However, all satellite C2 procedures share basic properties. For example, all satellite C2 procedures will have a procedure name, one or more inputs to the procedure, and one or more outputs from the procedure. In addition, each input to a procedure and output from a procedure comprises a variable name, data type, and value.

FIG. 5 is an example of a portion of an XML document that defines the translation between the YANG-based RPC above (e.g., "route-to-gw-to-sat") and the four satellite C2 procedures that are called by satellite C2 system 410 to perform the detailed configuration of the payload of satellite 310 that is necessary to enable the link between satellite gateway 230C and satellite 310, according to an embodiment. The "<inputs>" sections detail the inputs for each of the four satellite C2 procedures, including the variable name and data type. The XPath attribute ("yangXPath") of each "<input>" node defines the location (i.e., node) of the value of the respective input in the YANG-based XML document (e.g., illustrated above).

Advantageously, this XML-based translation by satellite payload controller 220D enables a YANG-based RPC to be mapped to any number of satellite C2 procedures having any number of inputs and outputs. In an embodiment, satellite payload controller 220D loads a translation XML document during start-up. The translation XML document defines all of the translations or mappings, from each YANG-based RPC to one or more corresponding satellite C2 procedures, in XML. When a particular one of the YANG-based RPCs is called (e.g., by the payload planner of server orchestrator 210B), satellite payload controller 220D uses the corresponding mapping in the translation XML document to translate the YANG-based RPC call into the mapped satellite C2 procedure(s). Satellite payload controller 220D then communicates the satellite C2 procedure(s), output by the translation, to satellite C2 system 410. Satellite C2 system 410 encodes these C2 procedure(s) into the RF link with satellite 310, according to the satellite manufacturer's control standard. This XML-based translation enables a single SDN-based satellite payload controller 220D to communicate with a plurality of satellite C2 systems 410 from different manufacturers and/or a plurality of satellites 310 from different manufacturers.

6. Example YANG Model

An example YANG model will now be described. It should be understood that the disclosed definitions are exemplary, rather than limiting, and that the YANG model may be defined differently in different implementations.

The following is an example definition of common data types to be used in the YANG model:

```
module ietf-yang-types {
  yang-version 1;
  namespace
    "urn:ietf:params:xml:ns:yang:ietf-yang-types";
  prefix yang;
  organization
    "IETF NETMOD (NETCONF Data Modeling Language) Working Group";
  contact
    "WG Web:   <http://tools.ietf.org/wg/netmod/>
     WG List:  <mailto:netmod@ietf.org>
     WG Chair: David Kessens
               <mailto:david.kessens@nsn.com>
     WG Chair: Juergen Schoenwaelder
               <mailto:j.schoenwaelder@jacobs-university.de>
     Editor:   Juergen Schoenwaelder
               <mailto:j.schoenwaelder@jacobs-university.de>";
  description
    "This module contains a collection of generally useful derived
     YANG data types.
     Copyright (c) 2013 IETF Trust and the persons identified as
     authors of the code. All rights reserved.
     Redistribution and use in source and binary forms, with or
     without modification, is permitted pursuant to, and subject
     to the license terms contained in, the Simplified BSD License
     set forth in Section 4.c of the IETF Trust's Legal Provisions
     Relating to IETF Documents
     (http://trustee.ietf.org/license-info).
     This version of this YANG module is part of RFC 6991; see
     the RFC itself for full legal notices.";
```

```
revision "2013-07-15" {
  description
    "This revision adds the following new data types:
    — yang-identifier
    — hex-string
    — uuid
    — dotted-quad";
  reference
    "RFC 6991: Common YANG Data Types";
}
revision "2010-09-24" {
  description "Initial revision.";
  reference
    "RFC 6021: Common YANG Data Types";
}
typedef counter32 {
  type uint32;
  description
    "The counter32 type represents a non-negative integer
    that monotonically increases until it reaches a
    maximum value of 2^32−1 (4294967295 decimal), when it
    wraps around and starts increasing again from zero.
    Counters have no defined 'initial' value, and thus, a
    single value of a counter has (in general) no information
    content. Discontinuities in the monotonically increasing
    value normally occur at re-initialization of the
    management system, and at other times as specified in the
    description of a schema node using this type. If such
    other times can occur, for example, the creation of
    a schema node of type counter32 at times other than
    re-initialization, then a corresponding schema node
    should be defined, with an appropriate type, to indicate
    the last discontinuity.
    The counter32 type should not be used for configuration
    schema nodes. A default statement SHOULD NOT be used in
    combination with the type counter32.
    In the value set and its semantics, this type is equivalent
    to the Counter32 type of the SMIv2.";
  reference
    "RFC 2578: Structure of Management Information Version 2
      (SMIv2)";
}
typedef zero-based-counter32 {
  type yang: counter32;
  default "0";
  description
    "The zero-based-counter32 type represents a counter32
    that has the defined 'initial ' value zero.
    A schema node of this type will be set to zero (0) on creation
    and will thereafter increase monotonically until it reaches
    a maximum value of 2^32−1 (4294967295 decimal), when it
    wraps around and starts increasing again from zero.
    Provided that an application discovers a new schema node
    of this type within the minimum time to wrap, it can use the
    'initial' value as a delta. It is important for a management
    station to be aware of this minimum time and the actual time
    between polls, and to discard data if the actual time is too
    long or there is no defined minimum time.
    In the value set and its semantics, this type is equivalent
    to the ZeroBasedCounter32 textual convention of the SMIv2.";
  reference
    "RFC 4502: Remote Network Monitoring Management Information
      Base Version 2";
}
typedef counter64 {
  type uint64;
  description
    "The counter64 type represents a non-negative integer
    that monotonically increases until it reaches a
    maximum value of 2^64−1 (18446744073709551615 decimal),
    when it wraps around and starts increasing again from zero.
    Counters have no defined 'initial' value, and thus, a
    single value of a counter has (in general) no information
    content. Discontinuities in the monotonically increasing
    value normally occur at re-initialization of the
    management system, and at other times as specified in the
    description of a schema node using this type. If such
    other times can occur, for example, the creation of
    a schema node of type counter64 at times other than
```

```
    re-initialization, then a corresponding schema node
    should be defined, with an appropriate type, to indicate
    the last discontinuity.
    The counter64 type should not be used for configuration
    schema nodes. A default statement SHOULD NOT be used in
    combination with the type counter64.
    In the value set and its semantics, this type is equivalent
    to the Counter64 type of the SMIv2.";
  reference
      "RFC 2578: Structure of Management Information Version 2
         (SMIv2)";
}
typedef zero-based-counter64 {
  type counter64;
  default "0";
  description
      "The zero-based-counter64 type represents a counter64 that
    has the defined 'initial' value zero.
    A schema node of this type will be set to zero (0) on creation
    and will thereafter increase monotonically until it reaches
    a maximum value of 2^64-1 (18446744073709551615 decimal),
    when it wraps around and starts increasing again from zero.
    Provided that an application discovers a new schema node
    of this type within the minimum time to wrap, it can use the
    'initial' value as a delta. It is important for a management
    station to be aware of this minimum time and the actual time
    between polls, and to discard data if the actual time is too
    long or there is no defined minimum time.
    In the value set and its semantics, this type is equivalent
    to the ZeroBasedCounter64 textual convention of the SMIv2.";
  reference
      "RFC 2856: Textual Conventions for Additional High Capacity
         Data Types";
}
typedef gauge32 {
  type uint32;
  description
      "The gauge32 type represents a non-negative integer, which
    may increase or decrease, but shall never exceed a maximum
    value, nor fall below a minimum value. The maximum value
    cannot be greater than 2^32-1 (4294967295 decimal), and
    the minimum value cannot be smaller than 0. The value of
    a gauge32 has its maximum value whenever the information
    being modeled is greater than or equal to its maximum
    value, and has its minimum value whenever the information
    being modeled is smaller than or equal to its minimum value.
    If the information being modeled subsequently decreases
    below (increases above) the maximum (minimum) value, the
    gauge32 also decreases (increases).
    In the value set and its semantics, this type is equivalent
    to the Gauge32 type of the SMIv2.";
  reference
      "RFC 2578: Structure of Management Information Version 2
         (SMIv2)";
}
typedef gauge64 {
  type uint64;
  description
      "The gauge64 type represents a non-negative integer, which
    may increase or decrease, but shall never exceed a maximum
    value, nor fall below a minimum value. The maximum value
    cannot be greater than 2^64-1 (18446744073709551615), and
    the minimum value cannot be smaller than 0. The value of
    a gauge64 has its maximum value whenever the information
    being modeled is greater than or equal to its maximum
    value, and has its minimum value whenever the information
    being modeled is smaller than or equal to its minimum value.
    If the information being modeled subsequently decreases
    below (increases above) the maximum (minimum) value, the
    gauge64 also decreases (increases).
    In the value set and its semantics, this type is equivalent
    to the CounterBasedGauge64 SMIv2 textual convention defined
    in RFC 2856";
  reference
      "RFC 2856: Textual Conventions for Additional High Capacity
         Data Types";
}
typedef object-identifier {
  type string {
```

```
    pattern
        '(([0-1](\.[1-3]?[0-9]))|(2\.(0|([1-9]\d*))))'
            + '(\.(0|([1-9]\d*)))*';
}
description
    "The object-identifier type represents administratively
    assigned names in a registration-hierarchical-name tree.
    Values of this type are denoted as a sequence of numerical
    non-negative sub-identifier values. Each sub-identifier
    value MUST NOT exceed 2^32-1 (4294967295). Sub-identifiers
    are separated by single dots and without any intermediate
    whitespace.
    The ASN.1 standard restricts the value space of the first
    sub-identifier to 0, 1, or 2. Furthermore, the value space
    of the second sub-identifier is restricted to the range
    0 to 39 if the first sub-identifier is 0 or 1. Finally,
    the ASN.1 standard requires that an object identifier
    has always at least two sub-identifiers. The pattern
    captures these restrictions.
    Although the number of sub-identifiers is not limited,
    module designers should realize that there may be
    implementations that stick with the SMIv2 limit of 128
    sub-identifiers.
    This type is a superset of the SMIv2 OBJECT IDENTIFIER type
    since it is not restricted to 128 sub-identifiers. Hence,
    this type SHOULD NOT be used to represent the SMIv2 OBJECT
    IDENTIFIER type; the object-identifier-128 type SHOULD be
    used instead.";
    reference
        "ISO9834-1: Information technology -- Open Systems
        Interconnection -- Procedures for the operation of OSI
        Registration Authorities: General procedures and top
        arcs of the ASN.1 Object Identifier tree";
}
typedef object-identifier-128 {
    type object-identifier {
        pattern '\d*(\.\d*){1,127}';
    }
    description
        "This type represents object-identifiers restricted to 128
        sub-identifiers.
        In the value set and its semantics, this type is equivalent
        to the OBJECT IDENTIFIER type of the SMIv2.";
    reference
        "RFC 2578: Structure of Management Information Version 2
            (SMIv2)";
}
typedef yang-identifier {
    type string {
        length "1 . . . max";
        pattern '[a-zA-Z_][a-zA-Z0-9\-_.]*';
        pattern
            '.|..|[^xX].*|.[^mM].*|..[^lL].*';
    }
    description
        "A YANG identifier string as defined by the 'identifier'
        rule in Section 12 of RFC 6020. An identifier must
        start with an alphabetic character or an underscore
        followed by an arbitrary sequence of alphabetic or
        numeric characters, underscores, hyphens, or dots.
        A YANG identifier MUST NOT start with any possible
        combination of the lowercase or uppercase character
        sequence 'xml'.";
    reference
        "RFC 6020: YANG - A Data Modeling Language for the Network
            Configuration Protocol (NETCONF)";
}
typedef date-and-time {
    type string {
        pattern
            '\d{4}-\d{2}-\d{2}T\d{2}:\d{2}:\d{2}(\.\d+)?'
                + '(z|[\+\-+\d{2}:\d{2})';
    }
    description
        "The date-and-time type is a profile of the ISO 8601
        standard for representation of dates and times using the
        Gregorian calendar. The profile is defined by the
        date-time production in Section 5.6 of RFC 3339.
```

-continued

The date-and-time type is compatible with the dateTime XML
schema type with the following notable exceptions:
(a) The date-and-time type does not allow negative years.
(b) The date-and-time time-offset −00:00 indicates an unknown
    time zone (see RFC 3339) while −00:00 and +00:00 and z
    all represent the same time zone in dateTime.
(c) The canonical format (see below) of data-and-time values
    differs from the canonical format used by the dateTime XML
    schema type, which requires all times to be in UTC using
    the time-offset 'z'.
This type is not equivalent to the DateAndTime textual
convention of the SMIv2 since RFC 3339 uses a different
separator between full-date and full-time and provides
higher resolution of time-secfrac.
The canonical format for date-and-time values with a known time
zone uses a numeric time zone offset that is calculated using
the device's configured known offset to UTC time. A change of
the device's offset to UTC time will cause date-and-time values
to change accordingly. Such changes might happen periodically
in case a server follows automatically daylight saving time
(DST) time zone offset changes. The canonical format for
date-and-time values with an unknown time zone (usually
referring to the notion of local time) uses the time-offset
−00:00.";
reference
    "RFC 3339: Date and Time on the Internet: Timestamps
      RFC 2579: Textual Conventions for SMIv2
      XSD-TYPES: XML Schema Part 2: Datatypes Second Edition";
}
typedef timeticks {
  type uint32;
  description
    "The timeticks type represents a non-negative integer that
  represents the time, modulo $2^{32}$ (4294967296 decimal), in
  hundredths of a second between two epochs. When a schema
  node is defined that uses this type, the description of
  the schema node identifies both of the reference epochs.
  In the value set and its semantics, this type is equivalent
  to the TimeTicks type of the SMIv2.";
  reference
    "RFC 2578: Structure of Management Information Version 2
      (SMIv2)";
}
typedef timestamp {
  type timeticks;
  description
    "The timestamp type represents the value of an associated
  timeticks schema node at which a specific occurrence
  happened. The specific occurrence must be defined in the
  description of any schema node defined using this type. When
  the specific occurrence occurred prior to the last time the
  associated timeticks attribute was zero, then the timestamp
  value is zero. Note that this requires all timestamp values
  to be reset to zero when the value of the associated timeticks
  attribute reaches 497+ days and wraps around to zero.
  The associated timeticks schema node must be specified
  in the description of any schema node using this type.
  In the value set and its semantics, this type is equivalent
  to the TimeStamp textual convention of the SMIv2.";
  reference
    "RFC 2579: Textual Conventions for SMIv2";
}
typedef phys-address {
  type string {
    pattern
      '([0-9a-fA-F]{2}(:[0-9a-fA-F]{2})*)?';
  }
  description
    "Represents media- or physical-level addresses represented
  as a sequence octets, each octet represented by two hexadecimal
  numbers. Octets are separated by colons. The canonical
  representation uses lowercase characters.
  In the value set and its semantics, this type is equivalent
  to the PhysAddress textual convention of the SMIv2.";
  reference
    "RFC 2579: Textual Conventions for SMIv2";
}
typedef mac-address {
  type string {

```
    pattern
        '[0-9a-fA-F]{2}(:[0-9a-fA-F]{2}){5}';
    }
    description
        "The mac-address type represents an IEEE 802 MAC address.
    The canonical representation uses lowercase characters.
    In the value set and its semantics, this type is equivalent
    to the MacAddress textual convention of the SMIv2.";
    reference
        "IEEE 802: IEEE Standard for Local and Metropolitan Area
Networks: Overview and Architecture
        RFC 2579: Textual Conventions for SMIv2";
  }
  typedef xpath1.0 {
    type string;
    description
        "This type represents an XPATH 1.0 expression.
    When a schema node is defined that uses this type, the
    description of the schema node MUST specify the XPath
    context in which the XPath expression is evaluated.";
    reference
        "XPATH: XML Path Language (XPath) Version 1.0";
  }
  typedef hex-string {
    type string {
      pattern
        '([0-9a-fA-F]{2}(:[0-9a-fA-F]{2})*)?';
    }
    description
        "A hexadecimal string with octets represented as hex digits
    separated by colons. The canonical representation uses
    lowercase characters.";
  }
  typedef uuid {
    type string {
      pattern
        '[0-9a-fA-F]{8}-[0-9a-fA-F]{4}-[0-9a-fA-F]{4}-'
          + [0-9a-fA-F]{4}-[0-9a-fA-F]{12}';
    }
    description
        "A Universally Unique IDentifier in the string representation
    defined in RFC 4122. The canonical representation uses
    lowercase characters.
    The following is an example of a UUID in string representation:
    f81d4fae-7dec-11d0-a765-00a0c91e6bf6
    ";
    reference
        "RFC 4122: A Universally Unique IDentifier (UUID) URN
          Namespace";
  }
  typedef dotted-quad {
    type string {
      pattern
        '(([0-9]|[1-9][0-9]|1[0-9][0-9]|2[0-4][0-9]|25[0-5])\.){3}'
          + '([0-9]|[1-9][0-9]|1[0-9][0-9]|2[0-4][0-9]|25[0-5])';
    }
    description
        "An unsigned 32-bit number expressed in the dotted-quad
    notation, i.e., four octets written as decimal numbers
    and separated with the '.' (full stop) character.";
  }
} // module ietf-yang-types
```

The following is an example definition of satellite-specific data types to be used in the YANG model:

```
// Contents of "kratos-sat-types"
module kratos-sat-types {
  namespace "urn:kratosspace:kratos-sat-types";
  prefix "kssattypes";
  description "Satellite payload model types for HTS";
  organization "Kratos Space";
  contact "Bob Potter";
  revision 2020-04-16 {
    description "Initial revision";
  }
```

-continued

```
  identity rf-component-state {
    description "state of rf component on satellite - active, spare,
broken";
  }
  identity active {
    base rf-component-state;
    description "rf-component state active";
  }
  identity spare {
    base rf-component-state;
    description "rf-component state spare";
  }
```

-continued

```
identity broken {
   base rf-component-state;
   description "rf-component state broken";
}
identity rf-component-type {
   description "type of rf component";
}
identity adc {
   base rf-component-type ;
   description "adc";
}
identity amplifier-1camp {
   base rf-component-type ;
   description "1camp amplifier";
}
identity amplifier-twt {
   base rf-component-type ;
   description "twt amp";
}
identity antenna-dish {
   base rf-component-type ;
   description "antenna";
}
identity antenna-phased-array {
   base rf-component-type ;
   description "antenna";
}
identity dac {
   base rf-component-type ;
   description "adc";
}
identity downlink-carrier {
   base rf-component-type ;
   description "down link carrier";
}
identity down-converter {
   base rf-component-type ;
   description "down converter";
}
identity lna {
   base rf-component-type ;
   description "lna";
}
identity uplink-carrier {
   base rf-component-type ;
   description "up link carrier";
}
identity up-converter {
   base rf-component-type ;
   description "up converter";
}
identity baseball-switch {
   base rf-component-type ;
   description "baseball switch";
}
identity antenna-direction {
   description "antenna type";
}
identity rx {
   base antenna-direction ;
   description "rx dish";
}
identity tx {
   base antenna-direction ;
   description "rx dish";
}
identity antenna-polarity {
   description "polarity";
}
identity pol-x {
   base antenna-polarity ;
   description "X axis pol";
}
identity pol-y {
   base antenna-polarity ;
   description "Y axis pol";
}
identity bb-switch-position {
   description "base ball switch position";
}
```

-continued

```
}
identity bb-switch-13 {
   base bb-switch-position;
   description "bb switch where 1 is connected to 3, 2 connected to 4";
}
identity bb-switch-14 {
   base bb-switch-position;
   description "bb switch where 1 is connected to 4, 2 connected to 3";
}
}
```

The following is an example definition of a matrix switch port in YANG:

```
// Contents of "kratos-matrixswitch-port"
module kratos-matrixswitch-port {
   namespace "urn:kratosspace:kratos-matrixswitch-port";
   prefix "ksmatport";
   import ietf-yang-types {prefix yang; revision-date "2013-07-15"; }
   import kratos-rf-planning-info { prefix ksrfplan; revision-date "2020-05-11";}
   description "Satellite Matrix Switch/Digital Signal Processer (DSPP) based on High Throughput Satellites (HTS).";
   organization "Kratos Space";
   contact "Bob Potter";
   revision 2020-04-07 {
      description "Initial revision";
   }
   identity channel-state {
      description "state of a channel assigned / not assigned";
   }
   identity assigned {
      base channel-state ;
      description "un assigned channel";
   }
   identity not-assigned {
      base channel-state ;
      description "un assigned channel";
   }
   identity signal-direction {
      description "route diection";
   }
   identity gateway-to-subscriber {
      base signal-direction ;
      description "Gateway to Subscriber Route Flow";
   }
   identity subscriber-to-gateway {
      base signal-direction ;
      description "Subscriber to Gateway Route Flow";
   }
   grouping port {
      leaf port-id {
         description "Port identifier";
         type yang:uuid;
      }
      leaf port-number {
         description "port number";
         type yang:counter32;
      }
      leaf bandwidth {
      description "Bandwidth of the port in MHz";
      type decimal64 {
         fraction-digits "6";
      }
      config false;
      }
      leaf sub-channel-count {
         description "Count of sub channels in this port";
         type yang:counter32;
      }
      leaf phase-noise {
      description "phase noise";
      type decimal64 {
         fraction-digits "3";
      }
```

-continued

```
        config false;
    }
        leaf noise-temperature {
    description "noise temperature";
    type decimal64 {
        fraction-digits "3";
    }
    config false;
    }
        uses ksrfplan:rf-planning-info;
        container sub-channels {
            list sub-channel{
                description "Sub channelization of a port on
satellite matrix switch";
                key sub-channel-id;
                leaf sub-channel-id {
                    description "Identification of the
subchannel";
                type yang:uuid;
                }
                leaf sub-channel-number {
                    description "channel number";
                    type yang:counter32;
                }
                leaf sub-channel-state {
                    description "state of the subchannel";
                    type identityref {
                        base ksmatport:channel-state;
                    }
                }
                leaf bandwidth {
                description "Bandwidth of the sub-channel in kHz";
                type decimal64 {
                    fraction-digits "3";
                }
                }
                config false;
            }
        }
    }
}
    grouping route {
        leaf route-id {
            description "the id of the route";
            type yang:uuid;
        }
        leaf route-name {
            description "the name of the route slice.port.sc-
sc_slice.port.sc-sc";
            type string;
        }
        leaf direction {
        description "direction of route flow";
            type identityref {
                base ksmatport:signal-direction;
            }
        }
        leaf input-slice {
            description "the id of the input slice";
            type yang:uuid;
        }
        leaf input-port {
            description "the id of the input port on the slice";
            type yang:uuid;
        }
        container input-channels {
            leaf-list input-channel {
                description "list of input channel ids, TODO these channels may
be contiguous";
                type yang:uuid;
            }
        }
        leaf output-slice {
            description "the id of the output slice";
            type yang:uuid;
        }
        leaf output-port{
            description "the id of the output port on the slice";
            type yang:uuid;
        }
```

-continued

```
        container output-channels {
            leaf-list output-channel {
                description "list of output channel ids, TODO these may be
contiguous";
                type yang:uuid;
            }
        }
    }
}
```

The following is an example definition of a phased array in YANG:

```
// Contents of "kratos-phased-array"
module kratos-phased-array {
    namespace "urn:kratosspace:kratos-phased-array";
    prefix "kspa";
    import ietf-yang-types {prefix yang; revision-date "2013-07-15"; }
    description "RF Phased array antenna module for use with HTS payload
modelling.";
    organization "Kratos Space";
    contact "Bob Potter";
    revision 2020-04-30 {
        description "Initial revision";
    }
    grouping phased-array-antenna {
        leaf element-count {
            description "number of elements in the array";
            type yang:counter32;
        }
        container pa-elements {
            list pa-element {
                description "The list of rf components";
                key pa-element-id;
                leaf pa-element-id {
                    description "element id";
                    type yang:uuid;
                }
                leaf attenuation {
                    description "Attenuation of the element";
                    type decimal64 {
                        fraction-digits "5";
                    }
                }
                leaf phase-shift {
                    description "phase shift coefficient";
                    type decimal64 {
                        fraction-digits "5";
                    }
                }
            } //end of list pa-element
        } //end of container pa-elements
        container antenna-array-matrix-switch {
            leaf aams-id {
                description "id of the antenna array matrix switch";
                type yang:uuid;
            }
            leaf is-feq-limited {
                description "is this antenna array matrix switch fequency
limited";
                type boolean;
            }
container aams-connections {
            list aams-connection {
                description "the list of connections in this matrix
switch";
                key aams-connection-id;
                leaf aams-connection-id {
                    description "id of the connection";
                    type yang:uuid;
                }
                leaf rf-component-id {
                    description "Id of the RA or LNA connect to the
beams(s)";
                    type yang:uuid;
                }
                container related-beams {
```

```
            leaf-list related-beam {
                description "list of Ids for associated
beams";
                type yang:uuid;
            }
        } // end of container beams
        leaf max-frequency {
            description "the max fequency of the related amp if
this is freq limited";
            type decimal64 {
                fraction-digits "5";
            }
        }
        leaf min-frequency {
            description "the min fequency of the related amp if
this is freq limited";
            type decimal64 {
                fraction-digits "5";
            }
        }
        } //end of list aams-connection
      } //end of conainter aams-connections
    } //end of container antenna-array-matrix switch
  } //end of grouping phased-array-antenna
}
```

The following is an example definition of RF planning information in YANG:

```
// Contents of "kratos-rf-planning-info"
module kratos-rf-planning-info {
    namespace "urn:opendaylight:kratos-rf-planning-info";
    prefix "ksrfplan";
    import ietf-yang-types {prefix yang; revision-date "2013-07-15"; }
    description "Radio Frequency (RF) planning data for use with HTS
payload modelling.";
    organization "Kratos Space";
    contact "Bob Potter";
    revision 2020-05-11 {
        description "Initial revision";
    }
    grouping rf-planning-info {
        container rf-common-planning-info {
            leaf delta-group-delay-matrix-depth {
                description "depth of the delta group delay matrix";
                type yang:counter32;
            }
            leaf delta-group-delay-matrix {
                description "depth of the delta group delay matrix ";
                type yang:counter32;
            }
            leaf frequency-response-matrix-depth {
                description "depth of the frequency response matrix";
                type yang:counter32;
            }
            leaf frequency-response-matrix {
                description "depth of the delta group delay matrix";
                type yang:counter32;
            }
        }
    }
}
```

The following is an example definition of satellite telemetry in YANG:

```
// Contents of "sat-telemetry"
module kratos-sat-telemetry {
    namespace "urn:kratosspace:kratos-sat-telemetry";
    prefix "kstelem";
    description "Basic telemetry grouping for satellite payload modelling";
    organization "Kratos Space";
    contact "Bob Potter";
    revision 2020-04-03 {
        description "Initial revision";
    }
    grouping sat-telemetry {
        container telemetry {
            leaf temperature {
                description "Temperature of telemetered component";
                type decimal64 {
                    fraction-digits "5";
                }
                config false;
            }
            leaf voltage {
                description "Voltage draw of telemetered component";
                type decimal64 {
                    fraction-digits "5";
                }
                config false;
            }
            leaf current {
                description "Current draw of telemetered component";
                type decimal64 {
                    fraction-digits "5";
                }
                config false;
            }
        }
    }
}
```

The following is an example satellite payload tree output of the payload YANG model:

```
module: kratos-sat-payload
  +--rw sat-payload
     +--rw payload-id?        yang:uuid
     +--rw payload-name?      string
     +--rw matrixSwitch
     |  +--rw slices
     |  |  +--rw slice* [slice-id]
     |  |     +--rw slice-id           yang:uuid
     |  |     +--rw slice-number?      yang:counter32
     |  |     +--ro port-count?        yang:counter32
     |  |     +--rw input-ports
     |  |     |  +--rw input-port* [port-id]
     |  |     |     +--rw port-id                yang:uuid
     |  |     |     +--rw port-number?           yang:counter32
     |  |     |     +--ro bandwidth?             decimal64
     |  |     |     +--rw sub-channel-count?     yang:counter32
     |  |     |     +--ro phase-noise?           decimal64
     |  |     |     +--ro noise-temperature?     decimal64
     |  |     |     +--rw rf-common-planning-info
     |  |     |     |  +--rw delta-group-delay-matrix-depth?    yang:counter32
```

```
   |  |   |    |  +--rw delta-group-delay-matrix?               yang:counter32
   |  |   |    |  +--rw frequency-response-matrix-depth?        yang:counter32
   |  |   |    |  +--rw frequency-response-matrix?              yang:counter32
   |  |   |    +--rw sub-channels
   |  |   |       +--rw sub-channel* [sub-channel-id]
   |  |   |          +--rw sub-channel-id          yang:uuid
   |  |   |          +--rw sub-channel-number?     yang:counter32
   |  |   |          +--rw sub-channel-state?      identityref
   |  |   |          +--ro bandwidth?              decimal64
   |  |   +--rw output-ports
   |  |      +--rw output-port* [port-id]
   |  |         +--rw port-id             yang:uuid
   |  |         +--rw port-number?        yang:counter32
   |  |         +--ro bandwidth?          decimal64
   |  |         +--rw sub-channel-count?  yang:counter32
   |  |         +--ro phase-noise?        decimal64
   |  |         +--ro noise-temperature?  decimal64
   |  |         +--rw rf-common-planning-info
   |  |         |  +--rw delta-group-delay-matrix-depth?         yang:counter32
   |  |         |  +--rw delta-group-delay-matrix?               yang:counter32
   |  |         |  +--rw frequency-response-matrix-depth?        yang:counter32
   |  |         |  +--rw frequency-response-matrix?              yang:counter32
   |  |         +--rw sub-channels
   |  |            +--rw sub-channel* [sub-channel-id]
   |  |               +--rw sub-channel-id          yang:uuid
   |  |               +--rw sub-channel-number?     yang:counter32
   |  |               +--rw sub-channel-state?      identityref
   |  |               +--ro bandwidth?              decimal64
   |  +--rw routes
   |     +--rw route* [route-id]
   |        +--rw route-id          yang:uuid
   |        +--rw route-name?       string
   |        +--rw direction?        identityref
   |        +--rw input-slice?      yang:uuid
   |        +--rw input-port?       yang:uuid
   |        +--rw input-channels
   |        |  +--rw input-channel*       yang:uuid
   |        +--rw output-slice?     yang:uuid
   |        +--rw output-port?      yang:uuid
   |        +--rw output-channels
   |           +--rw output-channel*      yang:uuid
   +--rw rf-component-chains
   |  +--rw rf-component-chain* [rf-component-chain-id]
   |     +--rw rf-component-chain-id     yang:uuid
   |     +--rw direction?                identityref
   |     +--rw assoc-slice-id?           yang:uuid
   |     +--rw assoc-port-id?            yang:uuid
   |     +--rw rf-component-ids
   |        +--rw rf-component-id*      yang:uuid
   +--rw rf-components
      +--rw rf-component* [component-id]
         +--rw component-id         yang:uuid
         +--rw component-type?      identityref
         +--rw component-state?     identityref
         +--rw related-components
         |  +--rw related-component*     yang:uuid
         +--rw uplink-carrier
         |  +--rw bandwidth?    decimal64
         |  +--rw ipfd?         decimal64
         +--rw antenna-dish
         |  +--rw direction?                identityref
         |  +--rw polarity?                 identityref
         |  +--rw pointing
         |  +--rw rf-common-planning-info
         |     +--rw delta-group-delay-matrix-depth?         yang:counter32
         |     +--rw delta-group-delay-matrix?               yang:counter32
         |     +--rw frequency-response-matrix-depth?        yang:counter32
         |     +--rw frequency-response-matrix?              yang:counter32
         +--rw lna
         |  +--ro phase-noise?        decimal64
         |  +--ro noise-temperature?  decimal64
         |  +--rw telemetry
         |  |  +--ro temperature?     decimal64
         |  |  +--ro voltage?         decimal64
         |  |  +--ro current?         decimal64
         |  +--rw rf-common-planning-info
         |     +--rw delta-group-delay-matrix-depth?         yang:counter32
         |     +--rw delta-group-delay-matrix?               yang:counter32
         |     +--rw frequency-response-matrix-depth?        yang:counter32
```

```
     |     +--rw frequency-response-matrix?             yang:counter32
     +--rw down-converter
     |  +--rw telemetry
     |  |  +--ro temperature?         decimal64
     |  |  +--ro voltage?             decimal64
     |  |  +--ro current?             decimal64
     |  +--rw rf-common-planning-info
     |  |  +--rw delta-group-delay-matrix-depth?        yang:counter32
     |  |  +--rw delta-group-delay-matrix?              yang:counter32
     |  |  +--rw frequency-response-matrix-depth?       yang:counter32
     |  |  +--rw frequency-response-matrix?             yang:counter32
     |  +--rw gainAdjust?             decimal64
     +--rw adc
     |  +--rw telemetry
     |  |  +--ro temperature?         decimal64
     |  |  +--ro voltage?             decimal64
     |  |  +--ro current?             decimal64
     |  +--rw rf-common-planning-info
     |     +--rw delta-group-delay-matrix-depth?        yang:counter32
     |     +--rw delta-group-delay-matrix?              yang:counter32
     |     +--rw frequency-response-matrix-depth?       yang:counter32
     |     +--rw frequency-response-matrix?             yang:counter32
     +--rw dac
     |  +--rw telemetry
     |  |  +--ro temperature?         decimal64
     |  |  +--ro voltage?             decimal64
     |  |  +--ro current?             decimal64
     |  +--rw rf-common-planning-info
     |     +--rw delta-group-delay-matrix-depth?        yang:counter32
     |     +--rw delta-group-delay-matrix?              yang:counter32
     |     +--rw frequency-response-matrix-depth?       yang:counter32
     |     +--rw frequency-response-matrix?             yang:counter32
     +--rw up-converter
     |  +--rw telemetry
     |  |  +--ro temperature?         decimal64
     |  |  +--ro voltage?             decimal64
     |  |  +--ro current?             decimal64
     |  +--rw rf-common-planning-info
     |  |  +--rw delta-group-delay-matrix-depth?        yang:counter32
     |  |  +--rw delta-group-delay-matrix?              yang:counter32
     |  |  +--rw frequency-response-matrix-depth?       yang:counter32
     |  |  +--rw frequency-response-matrix?             yang:counter32
     |  +--rw gainAdjust?             decimal64
     +--rw amplifier-1camp
     |  +--ro phase-noise?            decimal64
     |  +--ro noise-temperature?      decimal64
     |  +--rw gainAdjust?             decimal64
     |  +--rw telemetry
     |  |  +--ro temperature?         decimal64
     |  |  +--ro voltage?             decimal64
     |  |  +--ro current?             decimal64
     |  +--rw rf-common-planning-info
     |     +--rw delta-group-delay-matrix-depth?        yang:counter32
     |     +--rw delta-group-delay-matrix?              yang:counter32
     |     +--rw frequency-response-matrix-depth?       yang:counter32
     |     +--rw frequency-response-matrix?             yang:counter32
     +--rw amplifier-twt
     |  +--ro phase-noise?            decimal64
     |  +--ro noise-temperature?      decimal64
     |  +--ro noise-power-ratio?      decimal64
     |  +--rw telemetry
     |  |  +--ro temperature?         decimal64
     |  |  +--ro voltage?             decimal64
     |  |  +--ro current?             decimal64
     |  +--rw rf-common-planning-info
     |     +--rw delta-group-delay-matrix-depth?        yang:counter32
     |     +--rw delta-group-delay-matrix?              yang:counter32
     |     +--rw frequency-response-matrix-depth?       yang:counter32
     |     +--rw frequency-response-matrix?             yang:counter32
     +--rw antenna-phased-array
     |  +--rw element-count?                            yang:counter32
     |  +--rw pa-elements
     |  |  +--rw pa-element* [pa-element-id]
     |  |     +--rw pa-element-id     yang:uuid
     |  |     +--rw attenuation?      decimal64
     |  |     +--rw phase-shift?      decimal64
     |  +--rw antenna-array-matrix-switch
     |  |  +--rw aams-id?             yang:uuid
     |  |  +--rw is-feq-limited?      boolean
```

```
   |  |  +--rw aams-connections
   |  |     +--rw aams-connection* [aams-connection-id]
   |  |        +--rw aams-connection-id              yang:uuid
   |  |        +--rw rf-component-id?                yang:uuid
   |  |        +--rw related-beams
   |  |        |  +--rw related-beam*               yang:uuid
   |  |        +--rw max-frequency?                  decimal64
   |  |        +--rw min-frequency?                  decimal64
   |  +--rw telemetry
   |  |  +--ro temperature?          decimal64
   |  |  +--ro voltage?              decimal64
   |  |  +--ro current?              decimal64
   |  +--rw rf-common-planning-info
   |     +--rw delta-group-delay-matrix-depth?                yang:counter32
   |     +--rw delta-group-delay-matrix?                      yang:counter32
   |     +--rw frequency-response-matrix-depth?               yang:counter32
   |     +--rw frequency-response-matrix?                     yang:counter32
   +--rw downlink-carrier
   |  +--rw bandwidth?       decimal64
   |  +--rw eirp?            decimal64
   +--rw beam
   |  +--rw direction?               identityref
   |  +--rw max-frequency?           decimal64
   |  +--rw min-frequency?           decimal64
   |  +--rw pattern-depth?           yang:counter32
   |  +--rw pattern-center-power?    decimal64
   |  +--rw pattern-center-gt?       decimal64
   |  +--rw pattern?                 int32
   |  +--rw rf-common-planning-info
   |     +--rw delta-group-delay-matrix-depth?                yang:counter32
   |     +--rw delta-group-delay-matrix?                      yang:counter32
   |     +--rw frequency-response-matrix-depth?               yang:counter32
   |     +--rw frequency-response-matrix?                     yang:counter32
   +--rw baseball-switch
      +--rw switch-position?         identityref
      +--rw telemetry
      |  +--ro temperature?          decimal64
      |  +--ro voltage?              decimal64
      |  +--ro current?              decimal64
      +--rw rf-common-planning-info
         +--rw delta-group-delay-matrix-depth?                yang:counter32
         +--rw delta-group-delay-matrix?                      yang:counter32
         +--rw frequency-response-matrix-depth?               yang:counter32
         +--rw frequency-response-matrix?                     yang:counter32
rpcs:
  +---x build-route
     +---w input
     |  +---w route-id?            yang:uuid
     |  +---w route-name?          string
     |  +---w direction?           identityref
     |  +---w input-slice?         yang:uuid
     |  +---w input-port?          yang:uuid
     |  +---w input-channels
     |  |  +---w input-channel*    yang:uuid
     |  +---w output-slice?        yang:uuid
     |  +---w output-port?         yang:uuid
     |  +---w output-channels
     |     +---w output-channel*   yang:uuid
     +--ro output
        +--ro status?    string
```

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method of managing a communications network including orchestration of communication payloads in satellites, the method comprising:
 using a network planning system to:
  receive a service model of a service, wherein the service model is defined in the YANG data modeling language;
  generate one or more network models based on the service model, wherein each of the one or more network models represents a network, and is defined in the YANG data modeling language, and wherein each of the one or more network models comprises a payload model of a satellite payload in a satellite orbiting Earth satellite including payload information to enable service provisioning; and
  send at least one of the one or more network models to a control system in a network represented by the at least one network model; and
 using at least one hardware processor to:
  receive the payload model, wherein the payload model is defined in YANG data modeling language, and wherein the payload model represents a configuration for the satellite payload, wherein the satellite payload comprises one or more components, and wherein the configuration specifies a setting for at least one of the one or more components;
  translate the payload model into one or more satellite commands for configuring the satellite payload according to the configuration represented in the payload model; and
  reconfigure the satellite payload using the one or more satellite commands.

2. The method of claim 1, wherein the at least one hardware processor is comprised in a ground control system, and wherein reconfiguring the satellite payload comprises transmitting the one or more satellite commands to the satellite orbiting Earth.

3. The method of claim 1, wherein the at least one hardware processor is comprised in the satellite, and wherein the payload model is received via transmission from a ground control system.

4. The method of claim 1, wherein the method further comprises using the at least one hardware processor to:
 receive telemetry from the satellite orbiting Earth; and
 translate the telemetry into the payload model.

5. The method of claim 1, further comprising using the control system in the network to:
 receive the at least one network model;
 generate one or more device models based on the at least one network model, wherein each of the one or more device models represents a configuration of a network device in the network represented by the at least one network model, and is defined in the YANG data modeling language; and
 send at least one of the one or more device models to a network device represented by the at least one device model.

6. The method of claim 1, wherein the service model is received from an operations and business support system.

7. The method of claim 1, further comprising using the networking planning system to communicate with a network planning system in another domain.

8. The method of claim 7, wherein the other domain is a terrestrial communications domain.

9. The method of claim 1, wherein reconfiguring the satellite payload comprises provisioning the satellite payload for at least one new service.

10. The method of claim 1, wherein reconfiguring the satellite payload comprises changing at least one existing service of the satellite payload.

11. The method of claim 1, wherein reconfiguring the satellite payload comprises terminating at least one existing service of the satellite payload.

12. The method of claim 1, wherein the payload model further represents one or more capabilities of the satellite payload and one or more procedures for configuring the satellite payload to support one or more services.

13. The method of claim 1, wherein the payload model comprises a representation of a digital switch matrix or channelizer of the satellite payload, a representation of one or more radio frequency (RF) components of the satellite payload, and a representation of one or more connections between the digital switch matrix or channelizer and the one or more RF components.

14. The method of claim 13, wherein the payload model comprises a remote procedure call that updates a configuration of the digital switch matrix or channelizer.

15. The method of claim 13, wherein the payload model comprises a remote procedure call that accounts for changes in state and redundancy of the one or more RF components.

16. The method of claim 1, wherein the payload model comprises a representation of an analog-to-digital converter, a switch or a router, and a digital-to-analog converter.

17. The method of claim 1, wherein the payload model comprises a remote procedure call that retrieves a state of one or more components of the satellite payload.

18. The method of claim 1, wherein the payload model comprises a remote procedure call that accesses one or more telemetry functions of the satellite payload.

19. The method of claim 1, wherein the payload model comprises a representation of a phased array antenna as a plurality of antenna elements.

20. The method of claim 19, wherein each representation of one of the plurality of antenna elements comprises a representation of one or more beams, and wherein each representation of a beam represents one or more of a beam direction, minimum frequency, maximum frequency, power, gain, or normalized beam pattern.

21. The method of claim 1, wherein the payload model comprises a remote procedure call that updates the configuration for the satellite payload, and wherein translating the payload model into one or more satellite commands comprises:
 receiving a call to the remote procedure call, wherein the call is formatted in eXtensible Markup Language (XML);
 accessing a translation XML document that maps the remote procedure call to one or more satellite command and control (C2) procedures; and
 communicating the C2 procedures to a satellite C2 system that communicatively links with the satellite.

22. The method of claim 1, further comprising using the at least one hardware processor to:
 update the payload model to represent one or more of a current status, current configuration, or current performance of the satellite payload; and
 send the updated payload model to the network planning system.

23. The method of claim 22, further comprising using the network planning system to coordinate at least one service provided by the satellite payload with at least one service provided by one or more other network devices within a network, based on the payload model and a model, defined in the YANG data modeling language, of each of the one or more other network devices.

24. A system comprising:
a network planning system configured to:
receive a service model of a service, wherein the service model is defined in the YANG data modeling language;
generate one or more network models based on the service model, wherein each of the one or more network models represents a network, and is defined in the YANG data modeling language, and wherein each of the one or more network models comprises a payload model of a satellite payload in a satellite orbiting Earth satellite including payload information to enable service provisioning; and
send at least one of the one or more network models to a control system in a network represented by the at least one network model;
at least one hardware processor; and
one or more software modules that are configured to, when executed by the at least one hardware processor,
receive the payload model wherein the payload model represents a configuration for the satellite payload, wherein the satellite payload comprises one or more components, and wherein the configuration specifies a setting for at least one of the one or more components,
translate the payload model into one or more satellite commands for configuring the satellite payload according to the configuration represented in the payload model, and
reconfigure the satellite payload using the one or more satellite commands.

25. One or more non-transitory computer-readable medium having instructions stored therein, wherein the instructions, when executed by one or more processors, cause the one or more processors to:
receive a service model of a service, wherein the service model is defined in the YANG data modeling language;
generate one or more network models based on the service model, wherein each of the one or more network models represents a network, and is defined in the YANG data modeling language, and wherein each of the one or more network models comprises a payload model of a satellite payload in a satellite orbiting Earth satellite including payload information to enable service provisioning; and
send at least one of the one or more network models to a control system in a network represented by the at least one network model;
receive the payload model, wherein the payload model is defined in Yet Another Next Generation (YANG) data modeling language, and wherein the payload model represents a configuration for the satellite payload, wherein the satellite payload comprises one or more components, and wherein the configuration specifies a setting for at least one of the one or more components;
translate the payload model into one or more satellite commands for configuring the satellite payload according to the configuration represented in the payload model; and
reconfigure the satellite payload using the one or more satellite commands.

26. A method of orchestrating communication payloads in satellites in a communications network, the method comprising:
receive a service model of a service, wherein the service model is defined in the Yet Another Next Generation (YANG) data modeling language;
generate one or more network models based on the service model, wherein each of the one or more network models represents a network, and is defined in the YANG data modeling language, and wherein each of the one or more network models comprises a payload model of a satellite payload in a satellite orbiting Earth satellite including payload information to enable service provisioning;
send at least one of the one or more network models to a control system in a network represented by the at least one network model;
receive the payload model, wherein the payload model represents a configuration for the satellite payload, wherein the satellite payload comprises one or more components, and wherein the configuration specifies a setting for at least one of the one or more components;
translate the payload model into one or more satellite commands for configuring the satellite payload according to the configuration represented in the payload model; and
reconfigure the satellite payload using the one or more satellite commands.

* * * * *